US008953579B2

(12) United States Patent
Zhang et al.

(10) Patent No.: US 8,953,579 B2
(45) Date of Patent: Feb. 10, 2015

(54) FREQUENCY DUPLICATION MODE FOR USE IN WIRELESS LOCAL AREA NETWORKS (WLANS)

(71) Applicant: Marvell World Trade Ltd., St. Michael (BB)

(72) Inventors: Hongyuan Zhang, Fremont, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 124 days.

(21) Appl. No.: 13/679,221

(22) Filed: Nov. 16, 2012

(65) Prior Publication Data
US 2013/0121348 A1 May 16, 2013

Related U.S. Application Data

(60) Provisional application No. 61/560,733, filed on Nov. 16, 2011.

(51) Int. Cl.
*H04J 3/24* (2006.01)
*H04L 29/06* (2006.01)
*H04B 7/12* (2006.01)
*H04L 5/00* (2006.01)
*H04L 1/00* (2006.01)
*H04L 1/04* (2006.01)
*H04L 27/26* (2006.01)

(52) U.S. Cl.
CPC ........ *H04L 29/06* (2013.01); *H04B 7/12* (2013.01); *H04L 5/0053* (2013.01); *H04L 1/0075* (2013.01); *H04L 1/04* (2013.01); *H04L 27/2602* (2013.01); *H04L 27/2633* (2013.01)
USPC .......................................... 370/349; 370/319

(58) Field of Classification Search
USPC .................. 370/349, 208, 203, 334, 474, 476
See application file for complete search history.

(56) References Cited

U.S. PATENT DOCUMENTS

| 7,577,085 B1 * | 8/2009 | Narasimhan .................. 370/206 |
| 2006/0013335 A1 | 1/2006 | Leabman |
| 2007/0097946 A1 | 5/2007 | Mujtaba |

(Continued)

FOREIGN PATENT DOCUMENTS

WO WO-2012/122119 A1 9/2012

OTHER PUBLICATIONS

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

(Continued)

*Primary Examiner* — Brenda H Pham

(57) ABSTRACT

In generating a physical layer (PHY) frequency duplication mode data unit for transmission via a communication channel, a preamble of the PHY frequency duplication mode data unit is generated. The preamble includes a signal field, and the preamble is configured so that a receiver can determine that the data unit is a frequency duplication mode-type data unit prior to decoding the signal field of the preamble. A payload of the PHY frequency duplication mode data unit is generated, and the PHY frequency duplication mode data unit is transmitted.

20 Claims, 11 Drawing Sheets

(56) References Cited

U.S. PATENT DOCUMENTS

| | | |
|---|---|---|
| 2009/0196163 A1 | 8/2009 | Du |
| 2010/0260159 A1 | 10/2010 | Zhang et al. |
| 2012/0195391 A1 | 8/2012 | Zhang et al. |
| 2012/0201316 A1 | 8/2012 | Zhang et al. |
| 2012/0243485 A1* | 9/2012 | Merlin et al. ............... 370/329 |
| 2012/0320889 A1* | 12/2012 | Zhang et al. ............... 370/338 |

OTHER PUBLICATIONS

Park, "Proposed Specification Framework for TGah", *The Institute of Electrical and Electronics Engineers*, doc. No. IEEE 802.11-11/1137r6, (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

Zhang et al., U.S. Appl. No. 13/494,505, filed Jun. 12, 2012, entitled "Low Bandwidth PHY for WLAN".

Zhang et al., U.S. Appl. No. 13/494,515, filed Jun. 12, 2012, entitled "Low Bandwidth PHY for WLAN".

Zhang et al., U.S. Appl. No. 13/494,527, filed Jun. 12, 2012, entitled "Low Bandwidth PHY for WLAN".

Zhang et al., U.S. Appl. No. 13/661,423, filed Oct. 26, 2012, entitled "Method and Apparatus for Automatically Detecting a Physical Layer (PHY) Mode of a Data Unit in a Wireless Local Area Network (WLAN)".

International Search Report and Written Opinion for International Application No. PCT/US2012/065507, dated Apr. 2, 2013.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jun. 2012.

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Oct. 2012.

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2013.

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jul. 2013.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Yu, et al. "Coverage extension for IEEE802.11ah," The Institute of Electrical and Electronics Engineers, doc. No. IEEE 802.11-11/0035r1, (Jan. 2011).

Taghavi et al., "Introductory Submission for TGah", doc. No. IEEE 802.11-11/0062r0, Institute for Electrical and Electronics Engineers, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11ah Data Transmission Flow," The Institute of Electrical and Electronics Engineers, doc. No. IEEE 802.11-11/1484r1, (Nov. 2011).

Park, "Proposed Specification Framework for TGah D9.x", The Institute of Electrical and Electronics Engineers, doc. No. IEEE 802.11-yy/xxxxr0, (Jul. 2012).

(56) References Cited

OTHER PUBLICATIONS

Vermani, et al. "Preamble Format for 1 MHz," The Institute of Electrical and Electronics Engineers, doc. No. IEEE 802.11-11/1482r2, (Nov. 2011).

Zhang et al., "1 MHz Waveform in Wider BW", The Institute of Electrical and Electronics Engineers, doc. No. IEEE 802.11-12/0309r1, (Mar. 2012).

Vermani, et al. "Spec Framework Text for PHY Numerology," The Institute of Electrical and Electronics Engineers, doc. No. IEEE 802.11-11/13111-0, (Sep. 2011).

Park, "Proposed Specification Framework for TGah", The Institute of Electrical and Electronics Engineers, doc. No. IEEE 802.11-11/1137r11, (Sep. 2012).

International Preliminary Report on Patentability for International Application No. PCT/US2012/065507, mailed May 30, 2014.

* cited by examiner

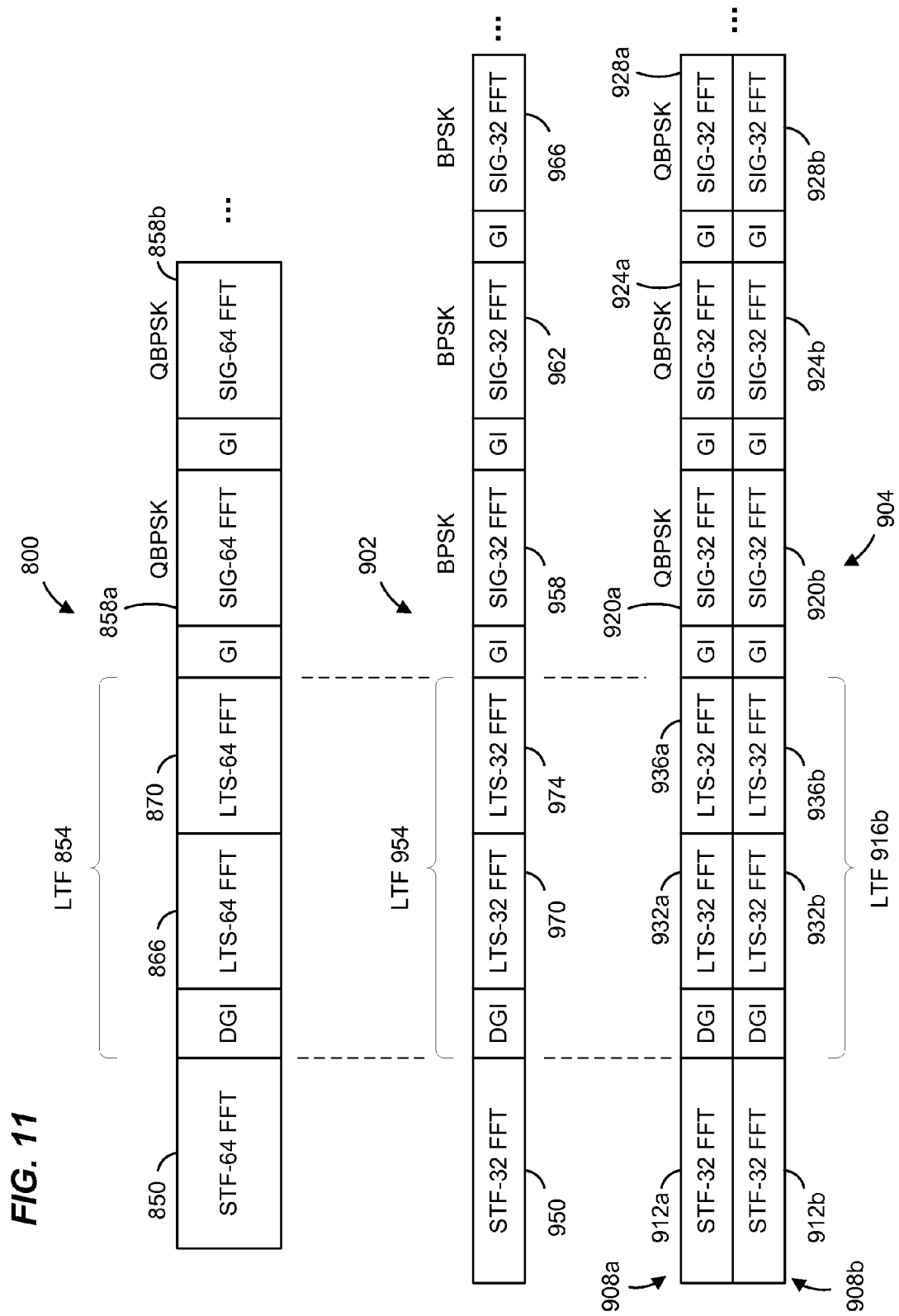

FREQUENCY DUPLICATION MODE FOR USE IN WIRELESS LOCAL AREA NETWORKS (WLANS)

CROSS-REFERENCES TO RELATED APPLICATIONS

This disclosure claims the benefit of U.S. Provisional Patent Application No. 61/560,733, filed on Nov. 16, 2011, the disclosure of which is incorporated herein by reference.

FIELD OF THE DISCLOSURE

The present disclosure relates generally to communication networks and, more particularly, to wireless local area networks that utilize duplication in the frequency domain to extend range and/or improve reception.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for generating a physical layer (PHY) frequency duplication mode data unit for transmission via a communication channel includes generating a preamble of the PHY frequency duplication mode data unit, wherein the preamble includes a signal field, and wherein the preamble is configured so that a receiver can determine that the data unit is a frequency duplication mode-type data unit prior to decoding the signal field of the preamble. The method also includes generating a payload of the PHY frequency duplication mode data unit, and causing the PHY frequency duplication mode data unit to be transmitted.

In other embodiments, the method includes one or more of the following features:

Generating the preamble comprises generating a training field of the preamble, wherein the training field of the preamble is different than training fields utilized in non-frequency duplication mode data units at corresponding positions in the non-frequency duplication mode data units;

The training field of the preamble is orthogonal or near orthogonal with a training field utilized in a non-frequency duplication mode data unit at a corresponding position in the non-frequency duplication mode data unit;

Generating the preamble comprises modulating a field of the preamble using a first modulation technique that is different than a second modulation technique utilized to modulate a field in a non-frequency duplication mode data unit at a corresponding position in the non-frequency duplication mode data unit;

The first modulation technique is one of (i) binary phase shift keying (BPSK), or (ii) quaternary binary phase shift keying (QBPSK), and the second modulation technique is the other one of (i) BPSK, or (ii) QBPSK;

Generating the preamble comprises generating a first training field of the preamble, wherein the first training field of the preamble is different than a training field utilized in a first non-frequency duplication mode data unit at a corresponding position in the first non-frequency duplication mode data units, and modulating one of (i) a second training field of the preamble, or (ii) a signal field of the preamble using a first modulation technique that is different than a second modulation technique utilized to modulate a field in a second non-frequency duplication mode data unit at a corresponding position in the second non-frequency duplication mode data unit.

The first non-frequency duplication mode data unit has a bandwidth equal to a bandwidth of the PHY frequency duplication mode data unit, and the second non-frequency duplication mode data unit has a bandwidth equal to a fraction of the bandwidth of the PHY frequency duplication mode data unit;

The first non-frequency duplication mode data unit has a bandwidth equal to a fraction of a bandwidth of the PHY frequency duplication mode data unit, and the second non-frequency duplication mode data unit has a bandwidth equal to the bandwidth of the PHY frequency duplication mode data unit;

Causing the PHY frequency duplication mode data unit to be transmitted comprises causing a training field of the preamble to be transmitted at a higher power than remaining portions of the PHY frequency duplication mode data unit;

Causing the PHY frequency duplication mode data unit to be transmitted comprises causing the training field of the preamble to be transmitted at a power 3 dB higher than the power of the remaining portions of the PHY frequency duplication mode data unit.

In another embodiment, an apparatus for generating a physical layer (PHY) data unit for transmission via a communication channel comprises a network interface configured to generate a preamble of the PHY frequency duplication mode data unit, wherein the preamble includes a signal field, and wherein the preamble is configured so that a receiver can determine that the data unit is a frequency duplication mode-type data unit prior to decoding the signal field of the preamble. The network interface is also configured to generate a payload of the PHY frequency duplication mode data unit, and transmit the PHY frequency duplication mode data unit.

In other embodiments, the apparatus includes one or more of the following features:

The network interface is configured to generate a training field of the preamble, wherein the training field of the preamble is different than training fields utilized in non-frequency duplication mode data units at corresponding positions in the non-frequency duplication mode data units;

The training field of the preamble is orthogonal or near orthogonal with a training field utilized in a non-frequency duplication mode data unit at a corresponding position in the non-frequency duplication mode data unit;

The network interface is configured to modulate a field of the preamble using a first modulation technique that is different than a second modulation technique utilized to modulate a field in a non-frequency duplication mode data unit at a corresponding position in the non-frequency duplication mode data unit;

The first modulation technique is one of (i) binary phase shift keying (BPSK), or (ii) quaternary binary phase shift keying (QBPSK), and the second modulation technique is the other one of (i) BPSK, or (ii) QBPSK;

The network interface is configured to generate a first training field of the preamble, wherein the first training field of the preamble is different than a training field utilized in a first non-frequency duplication mode data unit at a corresponding position in the first non-frequency duplication mode data units, and modulate one of (i) a second training field of the preamble, or (ii) a signal field of the preamble using a first modulation technique that is different than a second modulation technique utilized to modulate a field in a second non-frequency duplication mode data unit at a corresponding position in the second non-frequency duplication mode data unit;

The first non-frequency duplication mode data unit has a bandwidth equal to a bandwidth of the PHY frequency duplication mode data unit, and the second non-frequency duplication mode data unit has a bandwidth equal to a fraction of the bandwidth of the PHY frequency duplication mode data unit;

The first non-frequency duplication mode data unit has a bandwidth equal to a fraction of a bandwidth of the PHY frequency duplication mode data unit, and the second non-frequency duplication mode data unit has a bandwidth equal to the bandwidth of the PHY frequency duplication mode data unit;

The network interface is configured to transmit the training field of the preamble at a higher power than remaining portions of the PHY frequency duplication mode data unit;

The network interface is configured to transmit the training field of the preamble at a power 3 dB higher than the power of the remaining portions of the PHY frequency duplication mode data unit.

BRIEF DESCRIPTION OF THE DRAWINGS

FIG. 11 includes diagrams illustrating (i) an example preamble of a frequency duplication mode PHY data unit, (ii) an example preamble of a first non-frequency duplication mode PHY data unit, and (iii) an example preamble of a second non-frequency duplication mode PHY data unit, according to an embodiment.

DETAILED DESCRIPTION

Figure 1:
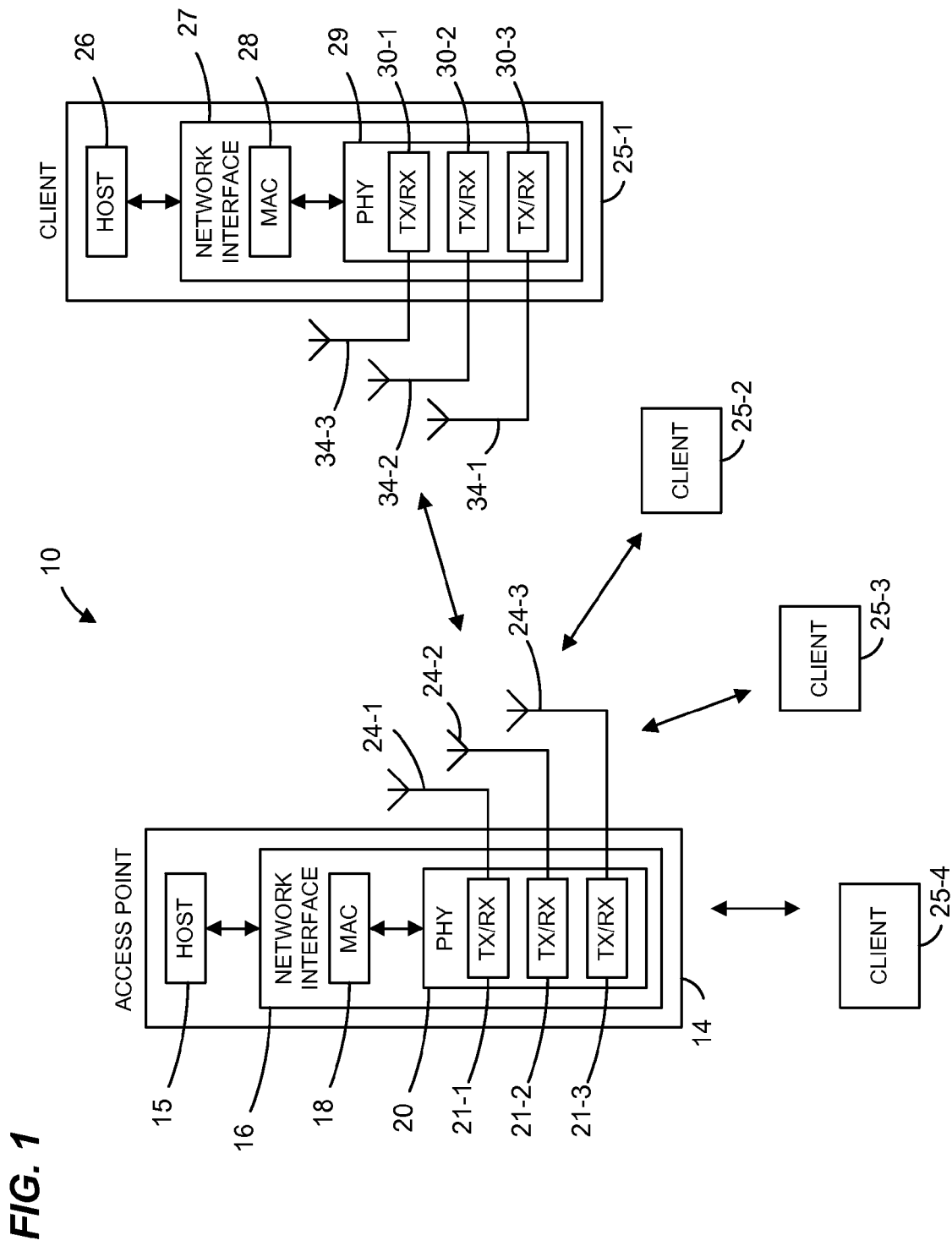
FIG. 1 is a block diagram of an example wireless local area network (WLAN) that utilizes frequency duplicated physical layer (PHY) data units, according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in an embodiment, a long range data unit maintains the physical layer format of a short range data unit, but is transmitted over a longer period of time.

In addition to this "normal mode" specified by the long range communication protocol, in some embodiments, the long range communication protocol also specifies a "frequency duplication mode" in which data transmitted in one bandwidth portion is duplicated and transmitted in one or more additional bandwidth portions. Because redundant information is transmitted, the receiver is able to utilize the redundancy to improve receiver sensitivity and thus further extend range. This is useful, for example, in situations in which regulatory requirements limit the power spectral density (PSD). For instance, when PSD is limited, overall power can be increased by sending a signal via increased bandwidth.

In some embodiments, the long range communication protocol also specifies a "low bandwidth mode" with a reduced bandwidth and data rate compared to the lowest bandwidth and data rate specified for the normal mode. Because of the lower data rate, the low bandwidth mode extends communication range and generally improves receiver sensitivity. Data units corresponding to the low bandwidth mode are generated utilizing the same clock rate as data units corresponding to the normal mode (e.g., are down-clocked by the same ratio used for normal mode data units).

In some embodiments, the normal mode and/or frequency duplication mode include multiple PHY sub-modes. In one embodiment, for example, the normal mode includes a first sub-mode corresponding to 2 MHz data units, a second sub-mode corresponding to 4 MHz data units, etc., a first sub-mode of the frequency duplication mode corresponds to a 1 MHz data signal duplicated into a 2 MHz bandwidth signal, and a second sub-mode of the frequency duplication mode corresponds to a 1 MHz data signal duplicated into a 4 MHz bandwidth signal. In another embodiment, the frequency duplication mode likewise includes only a single mode with a single bandwidth.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between short range and long range modes of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between short range and long range modes of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In still other embodiments, the client station 25-1 is a dual mode device capable of operating in different regions with different corresponding PHY modes. For example, in one such embodiment, the client station 25-1 is configured to utilize the low bandwidth mode PHY when operating in a first region (e.g., a region with limits on total power), and to utilize the frequency duplication mode PHY when operating in a second region (e.g., a region with limits on PSD). In an embodiment, the client station 25-1 can switch between low bandwidth and frequency duplication modes in the different regions by switching between frequency duplication mode and normal mode baseband signal processing of the transmitter and receiver, and switching digital and analog filters to meet the requirements applicable to each mode (e.g., spectral mask requirements at the transmitter, adjacent channel interference requirements at the receiver, etc.). Hardware settings such as clock rate, however, are unchanged when switching between frequency duplication mode and low bandwidth mode, in an embodiment.

In some embodiments, the client station 25-1 is a dual mode device capable of operating in different PHY modes for different frequency bands. For example, in one such embodiment, the client station 25-1 is configured to utilize the low bandwidth mode PHY when operating in a first frequency band (e.g., a frequency band subject to limits on total power), and to utilize the frequency duplication mode PHY when operating in a second frequency band (e.g., a frequency band subject to limits on PSD).

Figure 2:
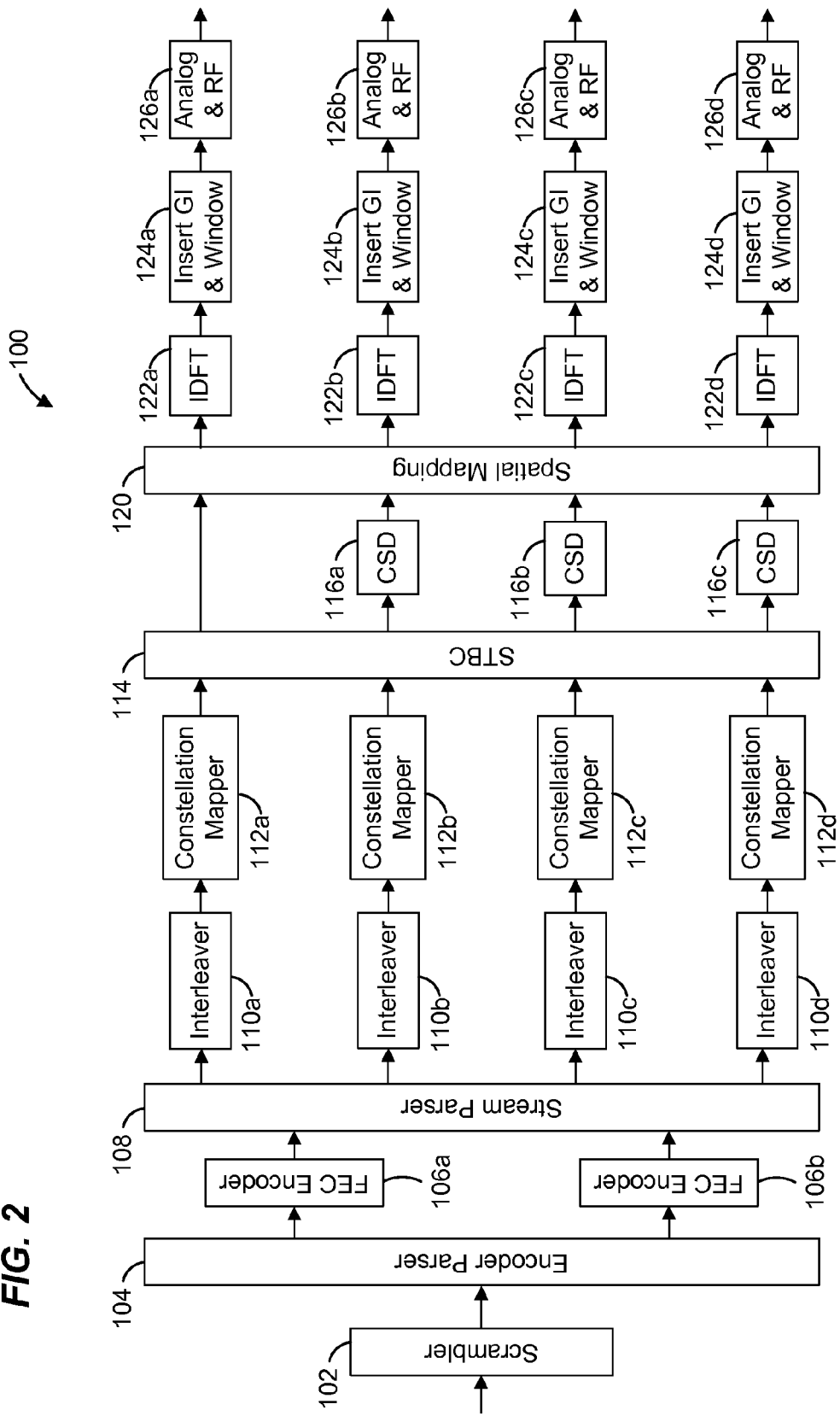
FIG. 2 is a block diagram of a transmit portion of an example PHY processing unit for generating normal mode and frequency duplication mode data units, according to an embodiment.

FIG. 2 is a block diagram of a transmit portion of an example PHY processing unit 100 for generating normal mode data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more FEC encoders 106.

While two FEC encoders 106 are shown in FIG. 2, different numbers of FEC encoders are included, and/or different numbers of FEC encoders operate in parallel, in various other embodiments and/or scenarios. For example, according to an embodiment, the PHY processing unit 100 includes only one FEC encoder 106. As another example, according to an embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/symbols. In an embodiment, the stream parser 108 is omitted.

Corresponding to each of the $N_{SS}$ spatial streams, an interleaver 110 interleaves bits of the spatial stream (i.e., changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units. Although four interleavers 110 are illustrated in FIG. 2, other suitable numbers of interleavers (e.g., 1, 2, 3, 5, 6, etc.) are utilized in other embodiments.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length $\log_2(M)$ into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, each constellation mapper 112 is configured to duplicate the M constellation points to create a set of constellation points having kM in the set, where k is a suitable positive integer (e.g., 2, 4, 8, etc.), according to a frequency duplication mode of operation. The kM constellation points are then utilized to generate a data unit with a wider bandwidth and with more subcarriers as compared to a data unit corresponding to M constellation points, as discussed in more detail below.

In an embodiment, a space-time block coding (STBC) unit 114 receives the constellation points corresponding to the one or more spatial streams and spreads the spatial streams to a number ($N_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted. In some embodiments, CSD units 116 are omitted, or a different suitable number of CSD units 116 other than three is utilized.

A spatial mapping unit 120 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. In some embodiments, the spatial mapping unit 120 is omitted. In some embodiments, a different suitable number of IDFT units 122 other than four are utilized.

Outputs of the IDFT units 122 are provided to GI insertion and windowing units 124 that prepend to OFDM symbols, a guard interval (GI) portion, which is a circular extension of an OFDM symbol in an embodiment, and smooth the edges of OFDM symbols to increase spectral delay. In some embodiments, a different suitable number of GI insertion and windowing units 124 other than four are utilized.

Outputs of the GI insertion and windowing units 124 are provided to analog and radio frequency (RF) units 126 that convert the signals to analog signals and upconvert the signals to RF frequencies for transmission. The signals are transmitted in a 2 MHz, a 4 MHz, an 8 MHz, or a 16 MHz bandwidth channel (e.g., corresponding to a 64-, 128-, 256-, or 512-point IDFT at unit 122,), in various embodiments and/or scenarios.

In other embodiments, other suitable channel bandwidths (and/or IDFT sizes) are utilized. In some embodiments, a different suitable number of RF units 126 other than four are utilized.

Frequency duplication mode communications are generally more robust than normal mode communications, having a sensitivity gain that supports extended range and/or lower error rate communications. For example, in an embodiment in which the normal mode utilizes a 64-point IDFT (e.g., for a 2 MHz bandwidth signal) to generate normal mode data units, and in which the frequency duplication mode utilizes a 32-point IDFT (e.g., for a 1 MHz bandwidth signal), and then duplicates the 32-point IDFT once to generate frequency duplication mode data units having a 2 MHz bandwidth. As another example, in an embodiment in which the normal mode utilizes a 128-point IDFT (e.g., for a 4 MHz bandwidth signal) to generate normal mode data units, and in which the frequency duplication mode utilizes a 32 point IDFT (e.g., for a 1 MHz bandwidth signal) and then duplicates the 32-point IDFT three times to generate frequency duplication mode data units having a 4 MHz bandwidth.

In some embodiments, PHY processing units employed by the AP 14 and/or by the client stations 25 to generate frequency duplication mode data units generally correspond to the same hardware as the PHY processing unit 100 of FIG. 2, but with different signal processing operations being utilized within the hardware depending on whether normal mode or frequency duplication mode data units are being generated. In some such embodiments, various parameters of certain components of the PHY processing unit 100 are changed when a frequency duplication mode data unit is generated.

Figure 3B:
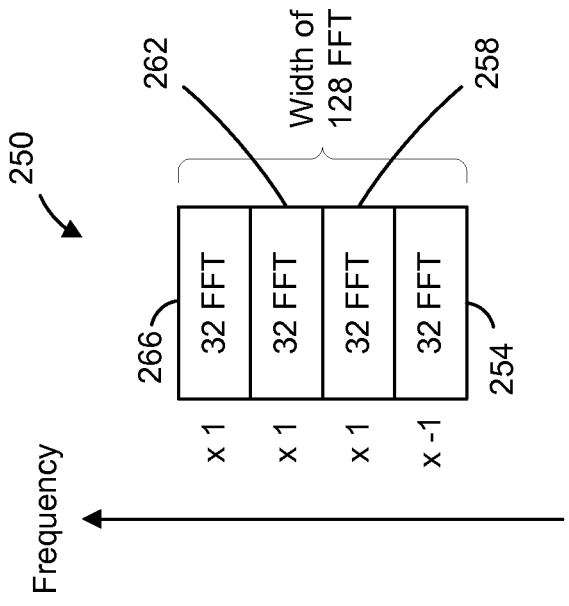
FIGS. 3A and 3B are diagrams of example frequency duplication mode PHY data units, according to several embodiments.
Figure 3A:
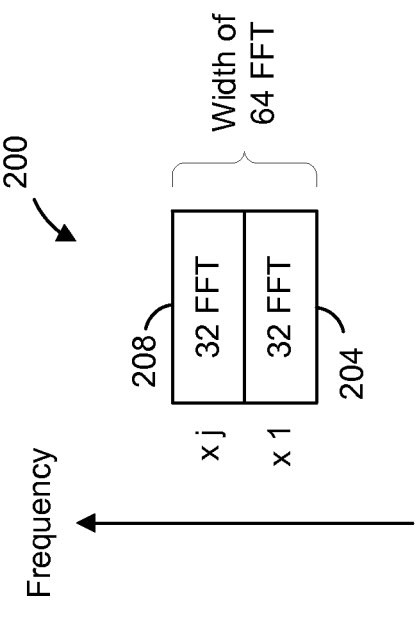

FIG. 3A is a diagram of an example duplication mode data unit 200 that the AP 14 is configured to transmit to the client station 25-4 via orthogonal frequency domain multiplexing (OFDM) modulation, according to an embodiment. In an embodiment, the client station 25-4 is also configured to transmit data units of the format 200 to the AP 14.

The data unit 200 is to be transmitted in a bandwidth that corresponds to a width 64 DFT (or FFT) data unit in a normal mode of operation. For example, if a 32 DFT (or FFT) corresponds to a signal transmitted in a 20 MHz wide channel, and a 64 DFT (or FFT) corresponds to a signal transmitted in a 40 MHz wide channel, the data unit 200 is for transmission in a 40 MHz wide channel. As another example, if a 64 DFT (or FFT) corresponds to a signal transmitted in a 20 MHz wide channel, the data unit 200 is for transmission in a 20 MHz wide channel.

The data unit 200 includes a first portion 204 and a second portion 208. Data in the second portion 208 is a duplicate of data in the first portion 204, in an embodiment. For example, a constellation mapper 112 (FIG. 2) generates constellation points corresponding to the first portion 204, and duplicates those constellation points to generate duplicate constellation points corresponding to the second portion 208, in an embodiment. An IDFT unit 122 (FIG. 2) then converts all of the constellation points corresponding to the first portion 204 and the second portion 208 to a time-domain signal, in an embodiment. In an embodiment, the second portion 208 is phase shifted with respect to the first portion 204. For example, in an embodiment, the second portion 208 is phase shifted by j (90 degrees) with respect to the first portion 204. In other embodiments, the second portion 208 is phase shifted with respect to the first portion 204 by some other suitable value such as 180 degrees (−1).

FIG. 3B is a diagram of an example duplication mode data unit 250 that the AP 14 is configured to transmit to the client station 25-4 via OFDM modulation, according to an embodiment. In an embodiment, the client station 25-4 is also configured to transmit data units of the format 250 to the AP 14.

The data unit 250 is to be transmitted in a bandwidth that corresponds to a width 128 DFT (or FFT) data unit in a normal mode of operation. For example, if a 32 DFT (or FFT) corresponds to a signal transmitted in a 20 MHz wide channel, and a 128 DFT (or FFT) corresponds to a signal transmitted in an 80 MHz wide channel, the data unit 250 is for transmission in an 80 MHz wide channel. As another example, if a 128 DFT (or FFT) corresponds to a signal transmitted in a 40 MHz wide channel, the data unit 200 is for transmission in a 40 MHz wide channel.

The data unit 250 includes a first portion 254, a second portion 258, a third portion 262, and a fourth portion 266. Data in the second portion 258, the third portion 262, and the fourth portion 266 is a duplicate of data in the first portion 254, in an embodiment. For example, a constellation mapper 112 (FIG. 2) generates constellation points corresponding to the first portion 254, and duplicates those constellation points to generate duplicate constellation points corresponding to the second portion 258, the third portion 262, and the fourth portion 266, in an embodiment. An IDFT unit 122 (FIG. 2) then converts all of the constellation points corresponding to the first portion 254, the second portion 258, the third portion 262, and the fourth portion 266 to a time-domain signal, in an embodiment. In an embodiment, the first portion 254 is phase shifted with respect to one or more of the second portion 258, the third portion 262, and/or the fourth portion 266. For example, in an embodiment, the first portion 204 is phase shifted by −1 (180 degrees) with respect to the second portion 258, the third portion 262, and the fourth portion 266. In other embodiments, the first portion 204 is phase shifted with respect to the one or more of the second portion 258, the third portion 262, and/or the fourth portion 266 by some other suitable value (or values) such as 90 degrees (j).

In other embodiments, a frequency duplication mode data unit similar to FIGS. 3A and 3B is to be transmitted in a bandwidth that corresponds to a width 256 DFT (or FFT) data unit or a width 512 DFT (or FFT) data unit in a normal mode of operation. For example, if a 32 DFT (or FFT) corresponds to a signal transmitted in a 20 MHz wide channel, and a 256 DFT (or FFT) corresponds to a signal transmitted in a 160 MHz wide channel, the frequency duplication mode data unit is for transmission in a 160 MHz wide channel. As another example, if a 512 DFT (or FFT) corresponds to a signal transmitted in a 160 MHz wide channel, the frequency duplication mode data unit, corresponding to a 32 DFT signal duplicated 16 times, is for transmission in a 160 MHz wide channel. In general, if M is the number of constellation points in the portion that is to be duplicated and k is the duplication factor (e.g., a positive integer such as 2, 4, 8, 16, etc.), the bandwidth of the data unit is increased by a factor of k, as compared to the bandwidth of the portion to be duplicated, in the duplication mode, according to an embodiment.

In an embodiment, frequency duplication mode is permitted for multiple modulation coding schemes (MCSs) that correspond to a given size DFT (FFT) and that are allowed by the communication protocol utilized. For example, in an embodiment in which the utilized communication protocol allows a plurality of MCSs corresponding to a size 32 DFT (FFT), frequency duplication mode is permitted for multiple MCSs that correspond to size 32 DFT (FFT), in an embodiment. In an embodiment in which the utilized communication protocol allows a plurality of MCSs corresponding to a size 32 DFT (FFT), frequency duplication mode is permitted for all allowed MCSs that correspond to size 32 DFT (FFT), in an embodiment. In an embodiment in which the utilized communication protocol allows a plurality of MCSs corresponding to a size 32 DFT (FFT), frequency duplication mode is permitted for one MCS that corresponds to size 32 DFT (FFT), in an embodiment. For example, in an embodiment, frequency duplication mode is permitted for one MCS that corresponds to (i) size 32 DFT (FFT) and (ii) a lowest rate.

In an embodiment, a PHY processing unit is configured to generate a first portion of the frequency duplication mode data unit with different numbers of guard tones at the lower (in frequency) end of the first portion and the upper (in frequency) end of the first portion. For example, in one embodiment, a PHY processing unit is configured to generate a first portion of the frequency duplication mode data unit with three guard tones at the lower (in frequency) end of the first portion and two guard tones the upper (in frequency) end of the first portion. In some such embodiments, the processing unit is configured to generate a second portion of the frequency duplication mode data unit such that the number of guard tones at the upper (in frequency) end of the second portion is greater than or equal to the number of guard tones at the lower (in frequency) end of the first portion. For example, in one embodiment, the processing unit is configured to generate first and second portions of the frequency duplication mode data unit such that there are three guard tones at the lower (in frequency) end of the first portion, two guard tones at the upper (in frequency) end of the first portion, two or less guard tones at the lower (in frequency) end of the second portion, and three or more guard tones at the upper (in frequency) end of the second portion. In an embodiment, the processing unit is configured to generate a second portion of the frequency duplication mode data unit such that the ordering of tones is the reverse of the ordering of tones in a first portion of the frequency duplication mode data unit and such that the number of guard tones at the upper (in frequency) end of the second portion is greater than or equal to the number of guard tones at the lower (in frequency) end of the first portion. In an embodiment, the processing unit is configured to generate a second portion of the frequency duplication mode data unit such that the ordering of tones is circularly shifted (by one, two, etc.) as compared to the ordering of tones in a first portion of the frequency duplication mode data unit such that that the number of guard tones at the upper (in frequency) end of the second portion is greater than or equal to the number of guard tones at the lower (in frequency) end of the first portion.

Similarly, in some embodiments, the processing unit is configured to generate a second portion of the frequency duplication mode data unit such that the number of guard tones at the lower (in frequency) end of the second portion is greater than or equal to the number of guard tones at the upper (in frequency) end of the first portion. In an embodiment, the processing unit is configured to generate a second portion of the frequency duplication mode data unit such that the ordering of tones is the reverse of the ordering of tones in a first portion of the frequency duplication mode data unit and such that the number of guard tones at the lower (in frequency) end of the second portion is greater than or equal to the number of guard tones at the upper (in frequency) end of the first portion. In an embodiment, the processing unit is configured to generate a second portion of the frequency duplication mode data unit such that the ordering of tones is circularly shifted (by one, two, etc.) as compared to the ordering of tones in a first portion of the frequency duplication mode data unit such that that the number of guard tones at the lower (in frequency) end of the second portion is greater than or equal to the number of guard tones at the upper (in frequency) end of the first portion.

In some embodiments, a data portion of a frequency duplication mode data unit is duplicated as discussed above with respect to FIGS. 3A and 3B, for example, but a preamble, or a portion of the preamble, of the frequency duplication mode data unit is not similarly duplicated. For example, in an embodiment, the preamble, or a portion of the preamble, has a bandwidth corresponding to a size 32 DFT (FFT), for example, but the data portion is duplicated from a size 32 DFT (FFT) to a bandwidth corresponding to a size 64 DFT (FFT), for example.

Figure 4:
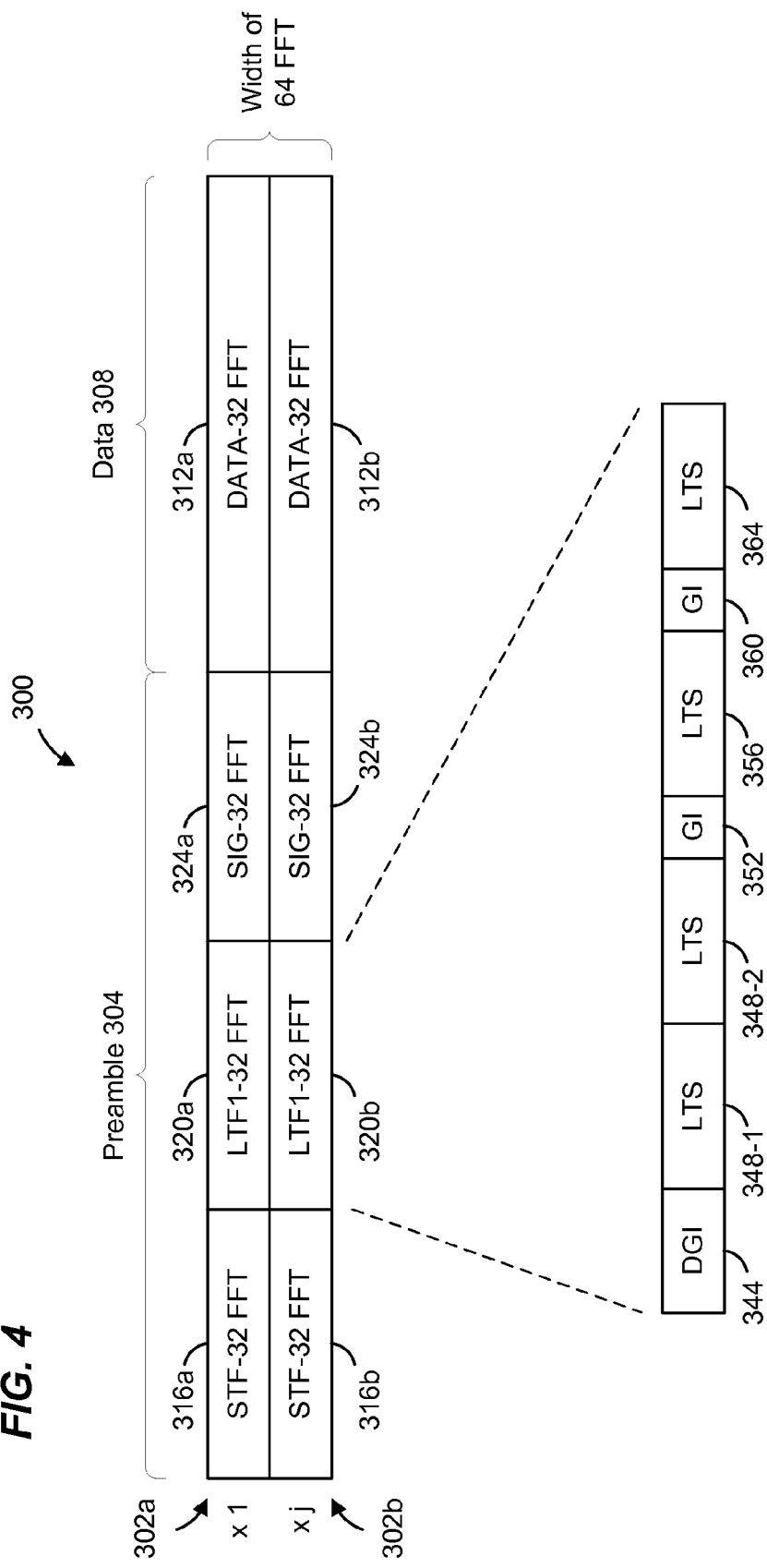
FIG. 4 is a diagrams of an example frequency duplication mode PHY data unit, according to an embodiment.

In other embodiments, both the preamble and the data portion of a frequency duplication mode data unit are duplicated as discussed above with respect to FIGS. 3A and 3B, for example. Referring now to FIG. 4, an example frequency duplication mode data unit 300 includes a first portion 302a and a second portion 302b. The second portion 302b is a duplicated version of the first portion 302a, in an embodiment. The second portion 302b is phase shifted by 90 degrees (j) with respect to the first portion 302a, in an embodiment. In other embodiments, the second portion 302b is phase shifted by another suitable amount (e.g. 180 degrees, 270 degrees, etc.) with respect to the first portion 302a. Each of the first portion 302a and the second portion 302b corresponds to a size 32 DFT (FFT), and the data unit 300 has a bandwidth corresponding to a size 64 DFT (FFT), in an embodiment.

The data unit 300 includes a preamble portion 304 and a data portion 308. The data portion 308 includes a first portion 312a corresponding to a size 32 DFT (FFT), and a second portion 312b corresponding to a size 32 DFT (FFT). The second portion 312b is a duplicated version of the first portion 312a, in an embodiment. The data portion 308 has a bandwidth corresponding to a size 64 DFT (FFT), in an embodiment.

The preamble 304 includes a first preamble portion including a short training field (STF) 316a, a long training field (LTF) 320a, and a signal (SIG) field 324a. The preamble includes a second preamble portion that is a duplicated version of the first preamble portion. The second preamble portion includes an STF 316b, an LTF 320b, and a SIG field 324b, which are duplicated from the STF 316a, the LTF 320a, and the SIG field 324a, respectively, in an embodiment. Each of the first preamble portion and the second preamble portion corresponds to a size 32 DFT (FFT), and the preamble 304 has a bandwidth corresponding to a size 64 DFT (FFT), in an embodiment. Each STF 316 includes four OFDM symbols, each LTF 320 includes four OFDM symbols, and each SIG field 324 includes six OFDM symbols, according to an embodiment. In other embodiments, each STF 316 includes, each LTF 320, and each SIG field 324 includes a different suitable number of OFDM symbols. In other embodiments, the preamble 304 includes additional fields not shown in FIG. 4.

In an embodiment, the first preamble portion is the same as or similar to a preamble of a size 32 DFT (FFT), non-duplicated data unit. Thus, the data unit 300 is encoded to signal, includes information that signals, etc., to a receiver that the data unit 300 is a frequency duplicated mode data unit rather than a size 32 DFT (FFT), non-duplicated data unit. Similarly, the data unit 300 is encoded to signal, includes information that signals, etc., to a receiver that the data unit 300 is a size 32 DFT (FFT) frequency duplicated mode data unit rather than a size 64 DFT (FFT), non-duplicated data unit.

In an embodiment, each SIG field 324 includes information that indicates the data unit 300 is a size 32 DFT (FFT) frequency duplicated mode data unit, and thus a receiver, after decoding one of the SIG fields 324, can determine that the data unit 300 is a size 32 DFT (FFT) frequency duplicated mode data unit and thus decode portions of the data unit 300 after the SIG fields 324 appropriately. For example, when decoding the data portion 308, the receiver utilizes maximum ration combining (MRC) to take advantage of the redundancy between the portions 312a and 312b to improve sensitivity, reduce the error rate, etc. On the other hand, when the receiver cannot decode one of the SIG fields 324 properly, the receiver may not be able to decode any of the data unit 300 properly, in an embodiment. Thus, it is advantageous to signal to the receiver that the data unit 300 is a size 32 DFT (FFT) frequency duplicated mode data unit so that the receiver can use this information when decoding the SIG field 324. For example, the receiver can take advantage of the redundancy between the portions 324a and 324b (e.g., using MRC decoding or another suitable technique) to improve sensitivity, reduce the error rate, improve the likelihood of decoding the SIG field 324 properly, etc.

In some embodiments, the LTF fields 320 are configured to signal to a receiver that the data unit 300 is a size 32 DFT (FFT) frequency duplicated mode data unit and/or that the data unit 300 is not a size 64 DFT (FFT) data unit. This assists the receiver to recognize the format of the data unit 300 in time to take advantage of the redundancy between the portions 324a and 324b in decoding the SIG field 324. For example, in an embodiment, at least portions of the LTF fields 320 designed to be different, e.g. orthogonal to or of a suitably low correlation with, the corresponding portions of LTFs in 64 DFT (FFT) data units.

Each LTF field 320 includes a double guard interval (DGI) 344 (e.g., double the length of a single guard interval (GI)), a plurality of long training sequences (LTSs) 348, a GI 352, an LTS 356, a GI 360, and an LTS 364. In an embodiment, one or more of the LTSs 348, 356, and/or 364 are configured such that cross-correlation of these tones in a frequency duplicated data unit with the corresponding tones in a normal mode unit having the same bandwidth results in a correlation value of zero or of another suitably low correlation value (e.g., less than or equal to 1). For example, in an embodiment, one or more of the LTSs 348, 356, and/or 364 are orthogonal, or near-orthogonal, with the corresponding LTSs in a normal mode unit having the same bandwidth. In an embodiment, the LTS 348-1 is orthogonal, or near-orthogonal, with the corresponding LTS in a normal mode unit having a bandwidth corresponding to a size 64 DFT (FFT). In other embodiments, a different and/or additional LTSs in the LTFs 320 are orthogonal, or near-orthogonal, with corresponding LTS(s) in the normal mode unit having a bandwidth corresponding to a size 64 DFT (FFT).

Figure 5:
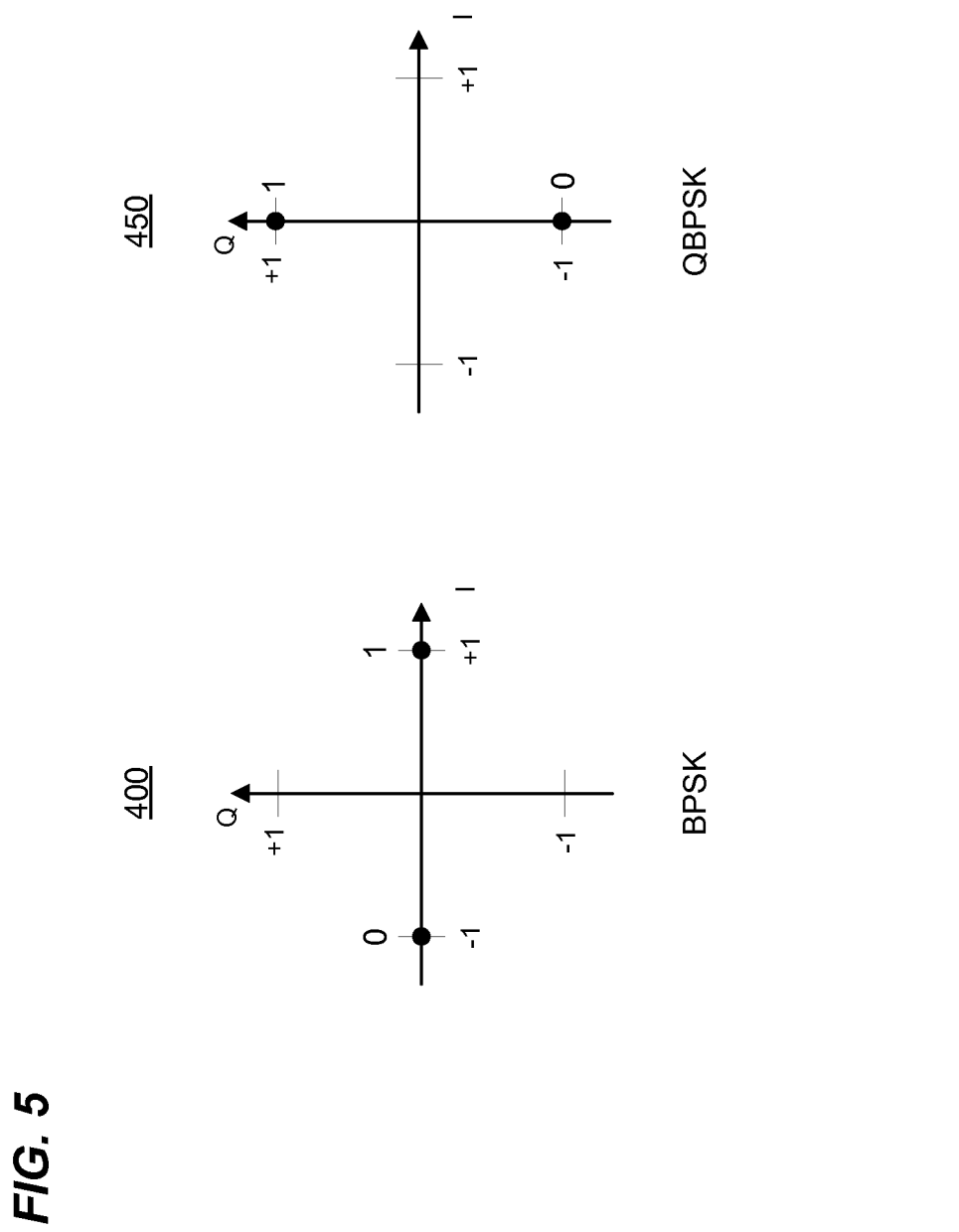
FIG. 5 are diagrams illustrating different modulation techniques that are utilized to modulate various fields in frequency duplication mode PHY data units and non-frequency duplication mode PHY data units, according to various embodiments.

In some embodiments, one or more fields in the data unit 300 are modulated differently than corresponding one or more fields in non-frequency duplicated data units to signal to a receiver that the data unit is a frequency duplicated mode data unit and/or that the data unit 300 is not a normal mode data unit of the same bandwidth. FIG. 5 are diagrams of two different modulation techniques that, when applied to one or more fields in preambles of data units, a receiver can utilize to distinguish between normal mode data units and frequency duplicated data units, in some embodiments.

A constellation diagram 400 illustrates binary phase shift keying modulation, whereas a constellation diagram 450 illustrates quaternary binary phase shift key (QBPSK) modulation. As can be seen in FIG. 5, QBPSK modulation is phase shifted by 90 degrees with respect to BPSK modulation. In some embodiments, a network interface unit of the transmitter modulates one or more fields in a preamble of a normal mode data unit using BPSK, whereas the network interface unit of the transmitter modulates one or more corresponding fields in a preamble of a frequency duplication mode data unit using QBPSK. In some embodiments, the network interface unit of the transmitter modulates one or more fields in a preamble of a normal mode data unit using QBPSK, whereas the network interface unit of the transmitter modulates one or more corresponding fields in a preamble of a frequency duplication mode data unit using BPSK. In some embodiments, a network interface unit at a receiver detects whether various fields in the preamble are modulated using BPSK or QBPSK, and determine the type of data unit based on whether the various fields in the preamble are modulated using BPSK or QBPSK.

In some embodiments, the network interface unit of the transmitter uses different LTSs and modulates preamble fields using different modulation techniques, as discussed above, to signal to a receiver the type of data unit being transmitted (e.g., frequency duplication mode versus non-frequency duplication mode). In some embodiments, a network interface unit at a receiver detects which LTS is present and whether various fields in the preamble are modulated using BPSK or QBPSK, and determines the type of data unit based on (i) which LTS is present, and (ii) whether the various fields in the preamble are modulated using BPSK or QBPSK.

Figure 6:
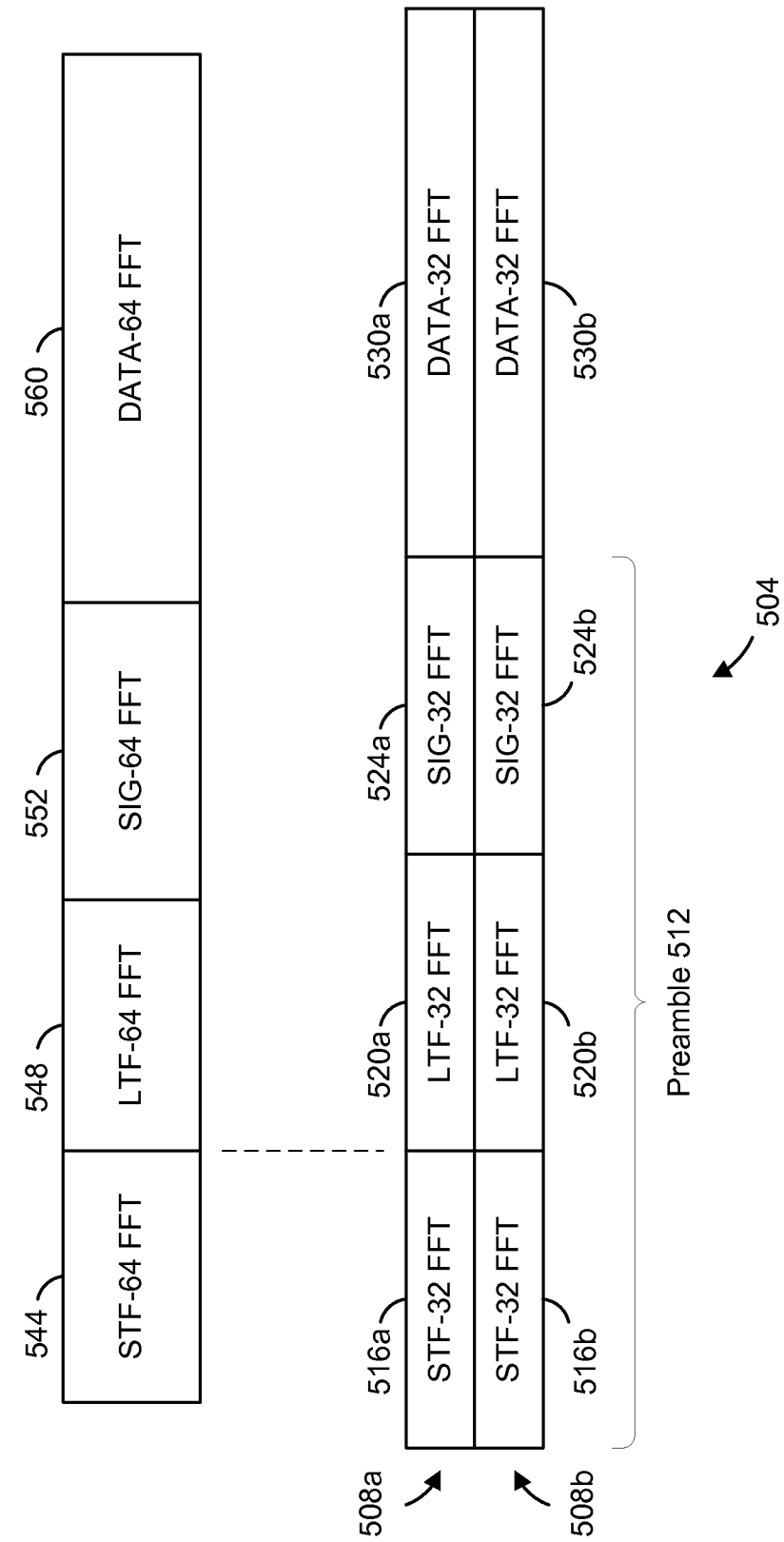
FIG. 6 includes diagrams illustrating an example frequency duplication mode PHY data unit and an example non-frequency duplication mode PHY data unit, according to an embodiment.

FIG. 6 is a diagram of an example normal mode data unit 500 having a bandwidth corresponding to a size 64 DFT (FFT), and a diagram of an example frequency duplication mode data unit 504 having a bandwidth corresponding to a size 64 DFT (FFT), according to an embodiment. The frequency duplication mode data unit 504 includes a first portion 508a corresponding to a size 32 DFT (FFT), and a second portion 508b corresponding to a size 32 DFT (FFT), where the second portion 508b is a duplicated version of the first portion 508a, in an embodiment.

The frequency duplication mode data unit 504 includes a preamble 512 and a data portion. The preamble 512 includes size 32 DFT (FFT) STFs 516, LTFs 520, and SIG fields 524. The data portion includes size 32 DFT (FFT) portions 530.

The normal mode data unit 500 includes a preamble and a data portion 560. The preamble includes an STF 544, an LTF 548, and a SIG field 552, each of size 64 DFT (FFT).

In some embodiments, the LTFs 520 are configured to signal to a receiver that the data unit 504 is a size 32 DFT (FFT) frequency duplicated mode data unit and/or that the data unit 504 is not the size 64 DFT (FFT) data unit 500. This assists the receiver to recognize the format of the data unit 504 in time to take advantage of the redundancy between the portions 524a and 524b in decoding the SIG field 524. For example, in an embodiment, at least portions of the LTFs 520 designed to be different, e.g. orthogonal to or of a suitably low correlation with, corresponding portions of the LTF 548. In an embodiment, one or more portions of the LTFs 520 are configured such that cross-correlation of these tones with the corresponding tones in the LTF 548 results in a correlation value of zero or of another suitably low correlation value (e.g., less than or equal to 1). For example, in an embodiment, one or more portions of the LTFs 520 are orthogonal, or near-orthogonal, with the corresponding portions in the LTF 548.

In some embodiments, the LTFs 520 and the LTF 548 each include LTSs (not shown). In some embodiments, one or more of the LTSs of the LTFs 520 are configured such that cross-correlation of these tones with the corresponding tones in the LTF 548 are zero or of another suitably low correlation value (e.g., less than or equal to 1). For example, in an embodiment, one or more of the LTSs of the LTFs 520 are orthogonal, or near-orthogonal, with the corresponding LTSs of the LTF 548.

Figure 7:
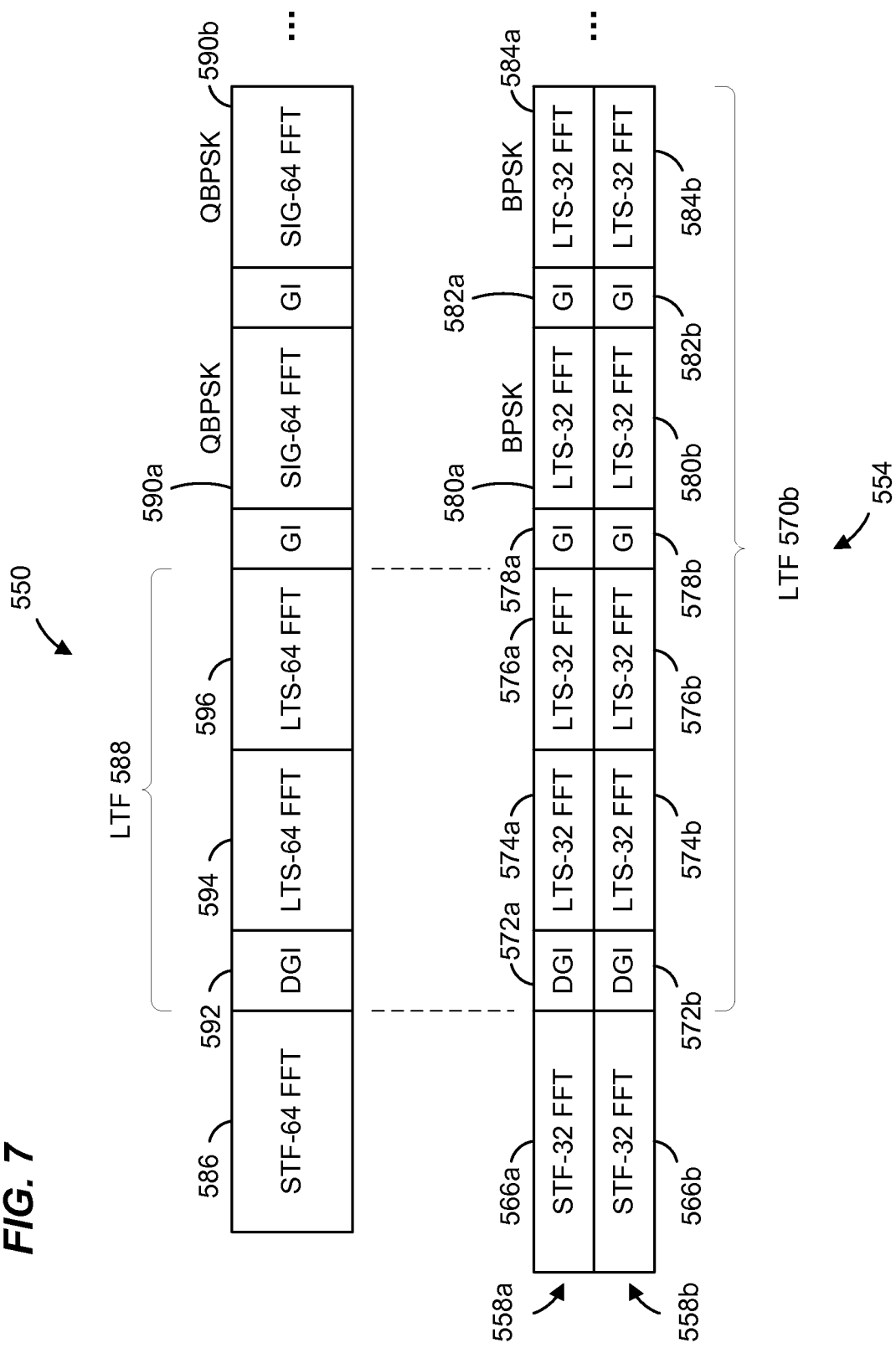
FIG. 7 includes diagrams illustrating an example preamble of a frequency duplication mode PHY data unit and an example preamble of a non-frequency duplication mode PHY data unit, according to an embodiment.

FIG. 7 is a diagram of a portion of a preamble 550 of an example normal mode data unit having a bandwidth corresponding to a size 64 DFT (FFT), and a diagram of a portion of a preamble 554 of an example frequency duplication mode data unit having a bandwidth corresponding to a size 64 DFT (FFT), according to an embodiment. The frequency duplication mode data unit includes a first portion 558a corresponding to a size 32 DFT (FFT), and a second portion 558b corresponding to a size 32 DFT (FFT), where the second portion 558b is a duplicated version of the first portion 558a, in an embodiment.

The preamble 554 of the frequency duplication mode data unit includes STF portions 566 and LTF portions 570, each of size 32 DFT (FFT). Each LTF portion 570 includes a DGI 572, an LTS 574, an LTS 576, a GI 578, an LTS 580, a GI 582, and an LTS 584.

The preamble 550 of the normal mode data unit includes an STF 586, an LTF 588, and SIG field portions 590. The LTF 588 includes a DGI 592, an LTS 594, and an LTS 596.

In some embodiments, one or both of the LTSs 574 and 576 are configured to signal to a receiver that the data unit including the preamble 554 is a size 32 DFT (FFT) frequency duplicated mode data unit and/or that the data unit including the preamble 554 is not a size 64 DFT (FFT) regular mode data unit. This assists the receiver to recognize the format of the data unit 554 in time to take advantage of the redundancy between different size 32 DFT (FFT) portions of the SIG field (not shown) of the preamble 554 in decoding the SIG field. For example, in some embodiments, one or both of the LTSs 574 and 576 are configured such that cross-correlation of these tones with the corresponding tones in the LTSs 594 and 596 are zero or of another suitably low correlation value (e.g., less than or equal to 1). For example, in an embodiment, one or both of the LTSs 574 and 576 are orthogonal, or near-orthogonal, with the corresponding LTSs 594 and 596. LTSs 574 correspond with the LTS 594 due to the time correspondence between (i) the beginning of LTSs 574 with respect to the end of the STFs 566, and (ii) the beginning of the LTS 594 with respect to the end of the STF 586, in some embodiments. Similarly, LTSs 576 correspond with the LTS 596 due to the time correspondence between (i) the beginning of LTSs 576 with respect to the end of the STFs 566, and (ii) the beginning of the LTS 596 with respect to the end of the STF 586, in some embodiments.

In other embodiments, however, the LTSs 574 and 576 are not configured to signal to a receiver that the data unit including the preamble 554 is a size 32 DFT (FFT) frequency duplicated mode data unit nor that the data unit including the preamble 554 is not a size 64 DFT (FFT) regular mode data unit.

In some embodiments, one or both of the LTSs 580 and 584 are configured to signal to a receiver that the data unit including the preamble 554 is a size 32 DFT (FFT) frequency duplicated mode data unit and/or that the data unit including the preamble 554 is not a size 64 DFT (FFT) regular mode data unit. This assists the receiver to recognize the format of the data unit 554 in time to take advantage of the redundancy between different size 32 DFT (FFT) portions of the SIG field (not shown) of the preamble 554 in decoding the SIG field. For example, in some embodiments, one or both of the LTSs 580 and 584 are modulated using BPSK, whereas corresponding in time SIG fields 590 are modulated using QBPSK. LTSs 580 of the preamble 554 correspond in time with the SIG field 590a of the preamble 550 due to the time correspondence between (i) the beginning of LTSs 580 with respect to the end of the STFs 566, and (ii) the beginning of the SIG field 590a with respect to the end of the STF 586, in some embodiments. Similarly, LTSs 584 of the preamble 554 correspond in time with the SIG field 590b of the preamble 550 due to the time correspondence between (i) the beginning of LTSs 584 with respect to the end of the STFs 566, and (ii) the beginning of the SIG field 590b with respect to the end of the STF 586, in some embodiments.

In other embodiments, one or both of the LTSs 580 and 584 are modulated using QBPSK, whereas corresponding in time SIG fields 590 are modulated using BPSK. In an embodiment, the LTSs 580 are modulated using QBPSK and the LTSs 584 are modulated using BPSK, whereas the SIG field 590a is modulated using BPSK and the SIG field 590b is modulated using QBPSK. In another embodiment, the LTSs 580 are modulated using BPSK and the LTSs 584 are modulated using QBPSK, whereas the SIG field 590a is modulated using QBPSK and the SIG field 590b is modulated using BPSK. Other similar variations are contemplated. In general, in some embodiments, at least one of the LTSs 580 and 584 of the preamble 554 is modulated using a different modulation technique than is used in the corresponding (in time) at least one SIG field 590 of the preamble 550.

Figure 8:
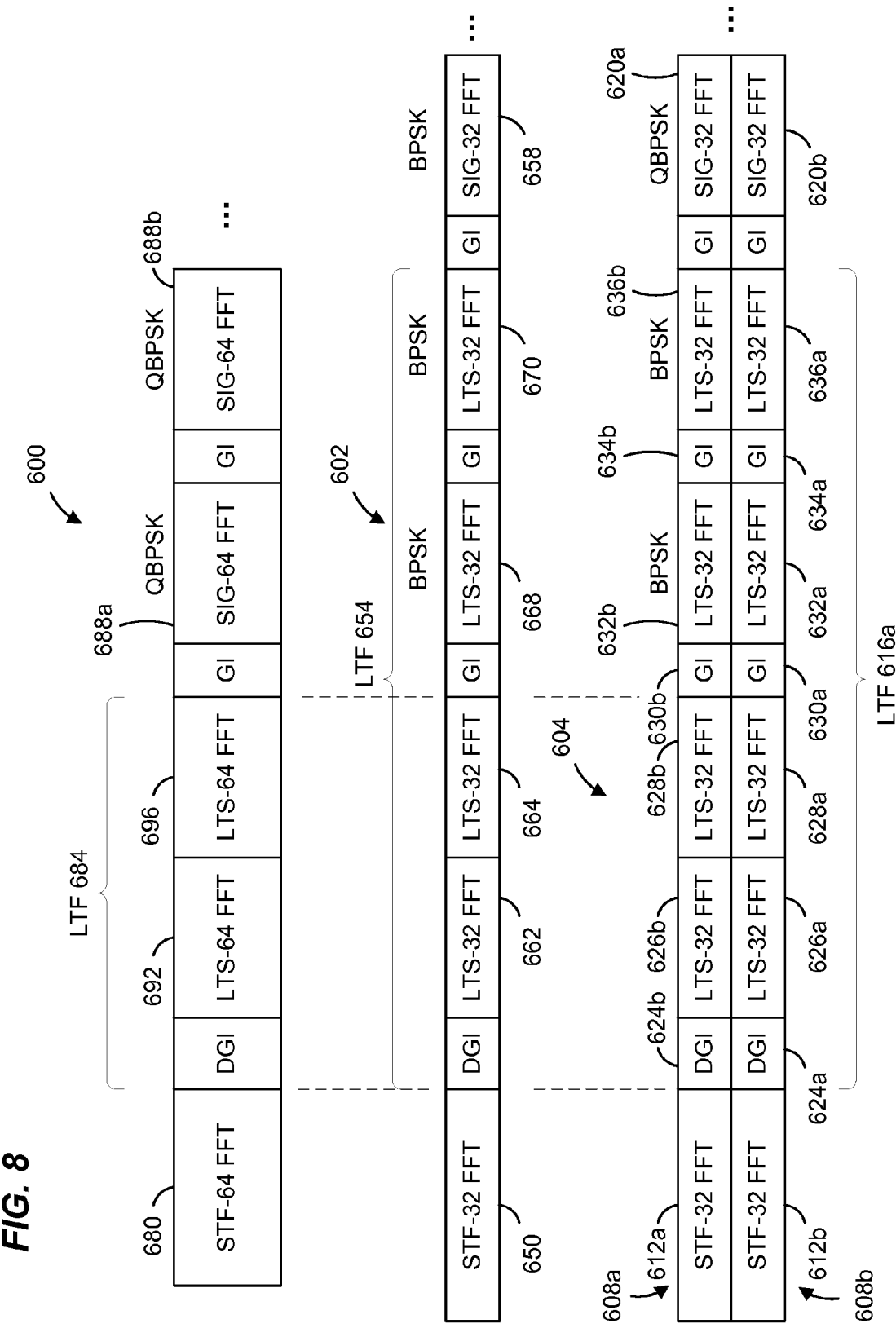
FIG. 8 includes diagrams illustrating (i) an example preamble of a frequency duplication mode PHY data unit, (ii) an example preamble of a first non-frequency duplication mode PHY data unit, and (iii) an example preamble of a second non-frequency duplication mode PHY data unit, according to an embodiment.

FIG. 8 is a diagram of a portion of a preamble 600 of an example normal mode data unit having a bandwidth corresponding to a size 64 DFT (FFT), a diagram of a portion of a preamble 604 of an example normal mode data unit having a bandwidth corresponding to a size 32 DFT (FFT), and a diagram of a portion of a preamble 608 of an example frequency duplication mode data unit having a bandwidth corresponding to a size 64 DFT (FFT), according to an embodiment. The frequency duplication mode data unit includes a first portion 608a corresponding to a size 32 DFT (FFT), and a second portion 608b corresponding to a size 32 DFT (FFT), where the second portion 608b is a duplicated version of the first portion 608a, in an embodiment.

The preamble 604 of the frequency duplication mode data unit includes STF portions 612, LTF portions 616 (each of size 32 DFT (FFT)), and SIG field portions 620. Each LTF portion 616 includes a DGI 624, an LTS 626, an LTS 628, a GI 630, an LTS 632, a GI 634, and an LTS 636.

The preamble 602 of the size 32 DFT (FFT) normal mode data unit includes an STF 650, an LTF 654, and a SIG field 658. The LTF 654 includes an LTS 662, an LTS 664, an LTS 668, and an LTS 670.

The preamble 600 of the size 64 DFT (FFT) normal mode data unit includes an STF 680, an LTF 684, and SIG field portions 658. The LTF 684 includes an LTS 692 and an LTS 696.

In some embodiments, one or both of the LTSs 626 and 628 are configured to signal to a receiver that the data unit including the preamble 604 is a size 32 DFT (FFT) frequency duplicated mode data unit and/or that the data unit including the preamble 604 is not a size 64 DFT (FFT) regular mode data unit. This assists the receiver to recognize the format of the data unit 604 in time to take advantage of the redundancy between different size 32 DFT (FFT) portions of the SIG field (not shown) of the preamble 604 in decoding the SIG field. For example, in some embodiments, one or both of the LTSs 626 and 628 are configured such that cross-correlation of these tones with the corresponding tones in the LTSs 692 and 696 are zero or of another suitably low correlation value (e.g., less than or equal to 1). For example, in an embodiment, one or both of the LTSs 626 and 628 are orthogonal, or near-orthogonal, with the corresponding LTSs 692 and 696. Thus, a receiver can detect that the data unit including the preamble 604 is not a size 64 DFT (FFT) regular mode data unit based on the LTSs 626 and 628. LTSs 626 correspond with the LTS 692 due to the time correspondence between (i) the beginning of LTSs 626 with respect to the end of the STFs 612, and (ii) the beginning of the LTS 692 with respect to the end of the STF 680, in some embodiments. Similarly, LTSs 628 correspond with the LTS 696 due to the time correspondence between (i) the beginning of LTSs 628 with respect to the end of the STFs 612, and (ii) the beginning of the LTS 696 with respect to the end of the STF 680, in some embodiments.

In other embodiments, however, the LTSs 626 and 628 are not configured to signal to a receiver that the data unit including the preamble 604 is a size 32 DFT (FFT) frequency duplicated mode data unit nor that the data unit including the preamble 604 is not a size 64 DFT (FFT) regular mode data unit.

In an embodiment, the LTS 662 of the preamble 602 is the same as each LTS 626 of the preamble 604. In an embodiment, the LTS 664 of the preamble 602 is the same as each LTS 628 of the preamble 604. In an embodiment, one or both of the LTSs 662 and 664 are configured to signal to a receiver that the data unit including the preamble 602 is not a size 64 DFT (FFT) regular mode data unit.

In some embodiments, one or both of the LTSs 626 and 628 are configured such that cross-correlation of these tones with the corresponding tones in the LTSs 662 and 664 are zero or of another suitably low correlation value (e.g., less than or equal to 1). For example, in an embodiment, one or both of the LTSs 626 and 628 are orthogonal, or near-orthogonal, with the corresponding LTSs 662 and 664. Thus, a receiver can detect that the data unit including the preamble 604 is not a size 32 DFT (FFT) regular mode data unit based on the LTSs 626 and 628, in an embodiment. LTSs 626 correspond with the LTS 662 due to the time correspondence between (i) the beginning of LTSs 626 with respect to the end of the STFs 612, and (ii) the beginning of the LTS 662 with respect to the end of the STF 650, in some embodiments. Similarly, LTSs 628 correspond with the LTS 664 due to the time correspondence between (i) the beginning of LTSs 628 with respect to the end of the STFs 612, and (ii) the beginning of the LTS 664 with respect to the end of the STF 650, in some embodiments.

In some embodiments, one or both of the LTSs 632 and 636 are configured to signal to a receiver that the data unit including the preamble 604 is a size 32 DFT (FFT) frequency duplicated mode data unit and/or that the data unit including the preamble 604 is not a size 64 DFT (FFT) regular mode data unit. This assists the receiver to recognize the format of the data unit 604 in time to take advantage of the redundancy between different size 32 DFT (FFT) portions of the SIG field 620 of the preamble 604 in decoding the SIG field 620. For example, in some embodiments, one or both of the LTSs 632 and 636 are modulated using BPSK, whereas corresponding in time SIG fields 688 are modulated using QBPSK. LTSs 632 of the preamble 604 correspond in time with the SIG field 688*a* of the preamble 600 due to the time correspondence between (i) the beginning of LTSs 632 with respect to the end of the STFs 612, and (ii) the beginning of the SIG field 688*a* with respect to the end of the STF 680, in some embodiments. Similarly, LTSs 636 of the preamble 604 correspond in time with the SIG field 688*b* of the preamble 600 due to the time correspondence between (i) the beginning of LTSs 636 with respect to the end of the STFs 612, and (ii) the beginning of the SIG field 688*b* with respect to the end of the STF 680, in some embodiments.

In other embodiments, one or both of the LTSs 632 and 636 are modulated using QBPSK, whereas corresponding in time SIG fields 688 are modulated using BPSK. In an embodiment, the LTSs 632 are modulated using QBPSK and the LTSs 636 are modulated using BPSK, whereas the SIG field 688*a* is modulated using BPSK and the SIG field 688*b* is modulated using QBPSK. In another embodiment, the LTSs 632 are modulated using BPSK and the LTSs 636 are modulated using QBPSK, whereas the SIG field 688*a* is modulated using QBPSK and the SIG field 688*b* is modulated using BPSK. Other similar variations are contemplated. In general, in some embodiments, at least one of the LTSs 632 and 636 of the preamble 604 is modulated using a different modulation technique than is used in the corresponding (in time) at least one SIG field 688 of the preamble 600.

In an embodiment, the LTSs 668 and 670 of the preamble 602 are modulated using the same technique as each corresponding in time LTS 632 and 636 of the preamble 604. In an embodiment, one or both of the LTSs 668 and 667064 are modulated to signal to a receiver that the data unit including the preamble 602 is not a size 64 DFT (FFT) regular mode data unit.

In some embodiments, the SIG field portions 620 of the preamble 604 are configured to signal to a receiver that the data unit including the preamble 604 is a size 32 DFT (FFT) frequency duplicated mode data unit and/or that the data unit including the preamble 604 is not a size 32 DFT (FFT) regular mode data unit. This assists the receiver to recognize the format of the data unit 604 in time to take advantage of the redundancy between different size 32 DFT (FFT) portions of the SIG field 620 of the preamble 604 in decoding the SIG field 620. For example, in some embodiments, the SIG field portions 620 are modulated using QPSK, whereas corresponding in time SIG field 658 of the preamble 602 is modulated using BPSK. SIG field portions 620 of the preamble 604 correspond in time with the SIG field 658 of the preamble 602 due to the time correspondence between (i) the beginning of SIG field portions 620 with respect to the end of the STFs 612, and (ii) the beginning of the SIG field 658 with respect to the end of the STF 650, in some embodiments. In other embodiments, the SIG field portions 620 are modulated using BPSK, whereas corresponding in time SIG field 658 is modulated using QBPSK.

Although not shown in FIG. 8, the preamble 604 and the preamble 602 each include additional SIG fields, in some embodiments. In some embodiments including additional SIG fields, one or more of the additional SIG fields of the preamble 604 are modulated using QBPSK, whereas corresponding (in time) one or more SIG fields in the preamble 602 are modulated using BPSK. In other embodiments including additional SIG fields, one or more of the additional SIG fields of the preamble 604 are modulated using BPSK, whereas corresponding (in time) one or more SIG fields in the preamble 602 are modulated using QBPSK.

In other embodiments, the SIG field portions 620 are modulated using the technique as used for the corresponding in time SIG field 658. For example, modulation one or both of the LTS fields 632 and 636 is utilized to distinguish between the preamble 604 versus the preamble 602, in an embodiment.

In some embodiments, one or both of the LTS fields 626 and 628 are configured (such as discussed above) to enable a receiver to distinguish the preamble 604 from a size 64 DFT (FFT) non-frequency duplicated mode data unit, while one or more SIG fields (e.g., SIG fields 620 and/or additional SIG fields (not shown)) of the preamble 604 are modulated using a different technique (such as discussed above) as compared to corresponding (in time) SIG fields in a size 32 DFT (FFT) non-frequency duplicated mode data unit to enable a receiver to distinguish the preamble 604 from a size 32 DFT (FFT) non-frequency duplicated mode data unit.

Figure 9:
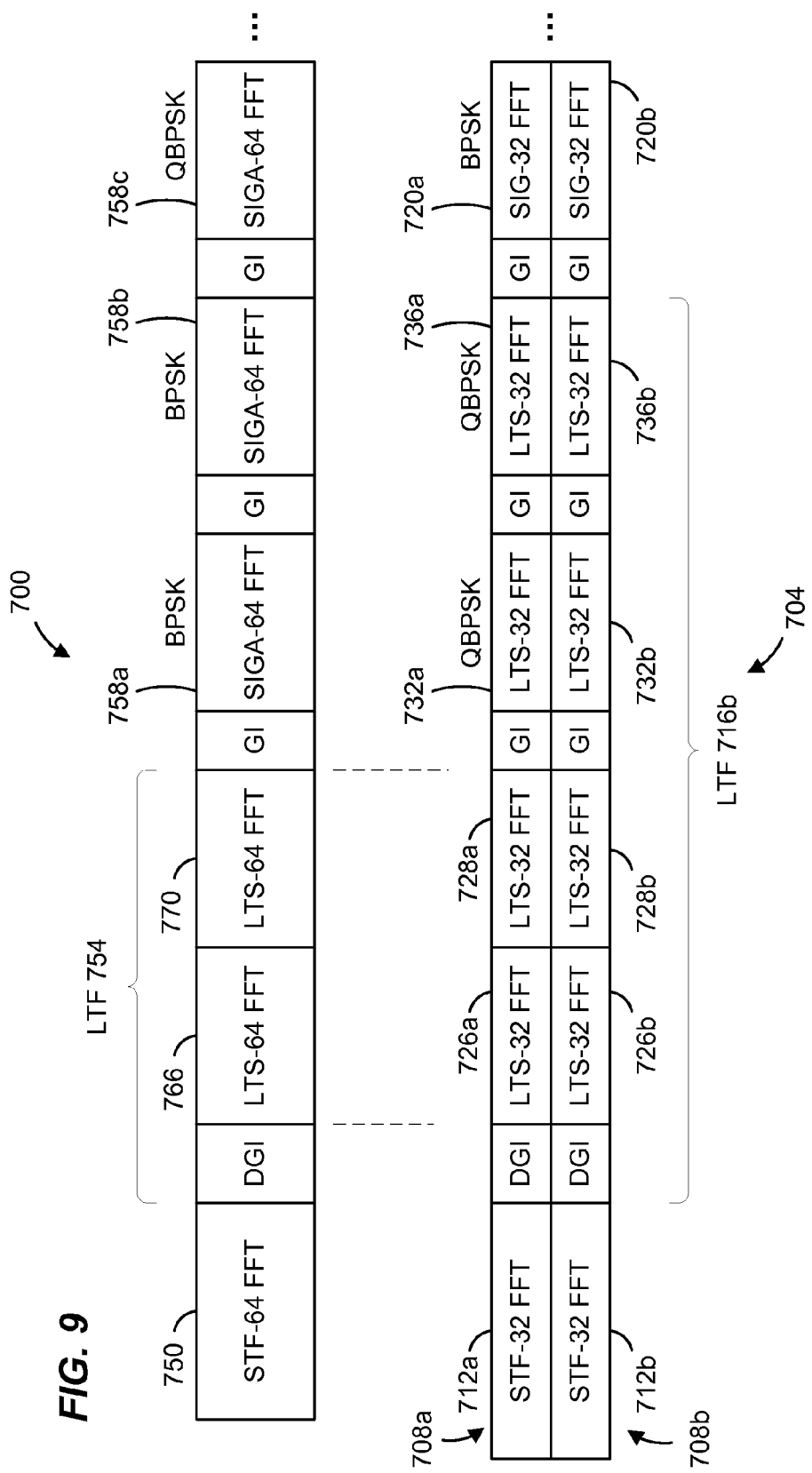
FIG. 9 includes diagrams illustrating an example preamble of a frequency duplication mode PHY data unit and an example preamble of a non-frequency duplication mode PHY data unit, according to an embodiment.

FIG. 9 is a diagram of a portion of a preamble 700 of an example normal mode data unit having a bandwidth corresponding to a size 64 DFT (FFT), and a diagram of a portion of a preamble 704 of an example frequency duplication mode data unit having a bandwidth corresponding to a size 64 DFT (FFT), according to an embodiment. The frequency duplication mode data unit includes a first portion 708a corresponding to a size 32 DFT (FFT), and a second portion 708b corresponding to a size 32 DFT (FFT), where the second portion 708b is a duplicated version of the first portion 708a, in an embodiment.

The preamble 704 of the frequency duplication mode data unit includes STF portions 712, LTF portions 716 (each of size 32 DFT (FFT)), and SIG field portions 720. Each LTF portion 716 includes an LTS 726, an LTS 728, an LTS 732, and an LTS 736.

The preamble 700 of the size 64 DFT (FFT) normal mode data unit includes an STF 750, an LTF 754, and SIG field portions 758. The LTF 754 includes an LTS 766 and an LTS 770.

In some embodiments, one or both of the LTSs 726 and 728 are configured to signal to a receiver that the data unit including the preamble 704 is a size 32 DFT (FFT) frequency duplicated mode data unit and/or that the data unit including the preamble 704 is not a size 64 DFT (FFT) regular mode data unit. This assists the receiver to recognize the format of the data unit 704 in time to take advantage of the redundancy between different size 32 DFT (FFT) portions of the SIG field of the preamble 704 in decoding the SIG field. For example, in some embodiments, one or both of the LTSs 726 and 728 are configured such that cross-correlation of these tones with the corresponding tones in the LTSs 766 and 770 are zero or of another suitably low correlation value (e.g., less than or equal to 1). For example, in an embodiment, one or both of the LTSs 726 and 728 are orthogonal, or near-orthogonal, with the corresponding LTSs 766 and 770. Thus, a receiver can detect that the data unit including the preamble 704 is not a size 64 DFT (FFT) regular mode data unit based on the LTSs 726 and 728. LTSs 726 correspond with the LTS 766 due to the time correspondence between (i) the beginning of LTSs 726 with respect to the end of the STFs 712, and (ii) the beginning of the LTS 766 with respect to the end of the STF 750, in some embodiments. Similarly, LTSs 728 correspond with the LTS 770 due to the time correspondence between (i) the beginning of LTSs 728 with respect to the end of the STFs 712, and (ii) the beginning of the LTS 770 with respect to the end of the STF 750, in some embodiments.

In other embodiments, however, the LTSs 726 and 728 are not configured to signal to a receiver that the data unit including the preamble 704 is a size 32 DFT (FFT) frequency duplicated mode data unit nor that the data unit including the preamble 704 is not a size 64 DFT (FFT) regular mode data unit.

In some embodiments, one or both of the LTSs 732 and 736 are configured to signal to a receiver that the data unit including the preamble 704 is a size 32 DFT (FFT) frequency duplicated mode data unit and/or that the data unit including the preamble 704 is not a size 64 DFT (FFT) regular mode data unit. This assists the receiver to recognize the format of the data unit 704 in time to take advantage of the redundancy between different size 32 DFT (FFT) portions of the SIG field 720 of the preamble 704 in decoding the SIG field 720. For example, in some embodiments, one or both of the LTSs 732 and 736 are modulated using QBPSK, whereas corresponding in time SIG fields 758a and 758b are modulated using BPSK. LTSs 732 of the preamble 704 correspond in time with the SIG field 758a of the preamble 700 due to the time correspondence between (i) the beginning of LTSs 732 with respect to the end of the STFs 712, and (ii) the beginning of the SIG field 758a with respect to the end of the STF 750, in some embodiments. Similarly, LTSs 736 of the preamble 704 correspond in time with the SIG field 758b of the preamble 700 due to the time correspondence between (i) the beginning of LTSs 736 with respect to the end of the STFs 712, and (ii) the beginning of the SIG field 758b with respect to the end of the STF 750, in some embodiments.

Similarly, in some embodiments, the SIG fields 720 are configured to signal to a receiver that the data unit including the preamble 704 is a size 32 DFT (FFT) frequency duplicated mode data unit and/or that the data unit including the preamble 704 is not a size 64 DFT (FFT) regular mode data unit. This assists the receiver to recognize the format of the data unit 704 in time to take advantage of the redundancy between different size 32 DFT (FFT) portions of the SIG field 720 of the preamble 704 in decoding the SIG field 720. For example, in some embodiments, the SIG fields 720 are modulated using BPSK, whereas corresponding in time SIG field 758c is modulated using QBPSK. The SIG fields 720 of the preamble 704 correspond in time with the SIG field 758c of the preamble 700 due to the time correspondence between (i) the beginning of the SIG fields 720 with respect to the end of the STFs 712, and (ii) the beginning of the SIG field 758c with respect to the end of the STF 750, in some embodiments.

In other embodiments, one or both of the LTSs 732 and 736 are modulated using BPSK, whereas corresponding in time SIG fields 758a and 758b are modulated using QBPSK. In an embodiment, the SIG fields 720 are modulated using QBPSK whereas the SIG field 758c is modulated using BPSK.

Although not shown in FIG. 9, the preamble 704 includes additional SIG fields, in some embodiments. In some embodiments including additional SIG fields, one or more of the additional SIG fields of the preamble 704 are modulated using BPSK. In some embodiments including additional SIG fields, one or more of the additional SIG fields of the preamble 704 are modulated using QBPSK.

In other embodiments, the SIG field portions 720 are modulated using the technique as used for the corresponding in time SIG field 758. For example, modulation one or both of the LTS fields 732 and 736 is utilized to distinguish between the preamble 704 versus the preamble 702, in an embodiment.

In general, one or more of (i) the LTS fields 732, (ii) the LTS fields 736, and (iii) the SIG fields 720 are modulated differently than the corresponding fields 758 in the preamble 700 to enable a receiver to distinguish between the preamble 700 and the preamble 704, in some embodiments.

Figure 10:
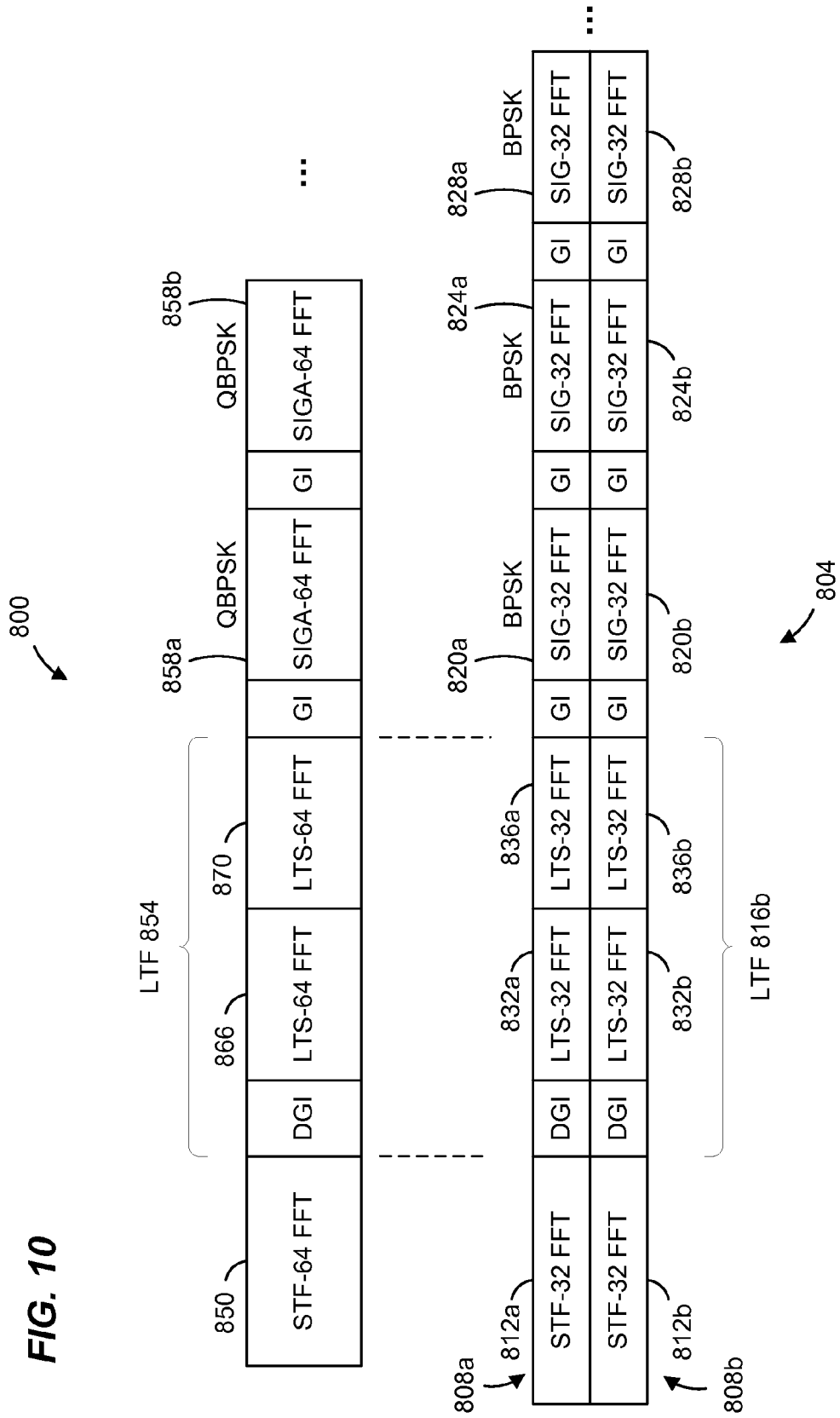
FIG. 10 includes diagrams illustrating an example preamble of a frequency duplication mode PHY data unit and an example preamble of a non-frequency duplication mode PHY data unit, according to an embodiment.

FIG. 10 is a diagram of a portion of a preamble 800 of an example normal mode data unit having a bandwidth corresponding to a size 64 DFT (FFT), and a diagram of a portion of a preamble 804 of an example frequency duplication mode data unit having a bandwidth corresponding to a size 64 DFT (FFT), according to an embodiment. The frequency duplication mode data unit includes a first portion 808a corresponding to a size 32 DFT (FFT), and a second portion 808b corresponding to a size 32 DFT (FFT), where the second portion 808b is a duplicated version of the first portion 808a, in an embodiment.

The preamble 804 of the frequency duplication mode data unit includes STF portions 812, LTF portions 816 (each of size 32 DFT (FFT)), and SIG field portions 820, 824, and 828. Each LTF portion 716 includes an LTS 832, and an LTS 836.

The preamble 800 of the size 64 DFT (FFT) normal mode data unit includes an STF 850, an LTF 854, and SIG field portions 858. The LTF 854 includes an LTS 866 and an LTS 870.

In some embodiments, one or both of the LTSs 832 and 836 are configured to signal to a receiver that the data unit including the preamble 804 is a size 32 DFT (FFT) frequency duplicated mode data unit and/or that the data unit including the preamble 804 is not a size 64 DFT (FFT) regular mode data unit. This assists the receiver to recognize the format of the data unit 804 in time to take advantage of the redundancy between different size 32 DFT (FFT) portions of the SIG field of the preamble 804 in decoding the SIG field. For example, in some embodiments, one or both of the LTSs 832 and 836 are configured such that cross-correlation of these tones with the corresponding tones in the LTSs 866 and 870 are zero or of another suitably low correlation value (e.g., less than or equal to 1). For example, in an embodiment, one or both of the LTSs 832 and 836 are orthogonal, or near-orthogonal, with the corresponding LTSs 866 and 870. Thus, a receiver can detect that the data unit including the preamble 804 is not a size 64 DFT (FFT) regular mode data unit based on the LTSs 832 and 836. LTSs 832 correspond with the LTS 866 due to the time correspondence between (i) the beginning of LTSs 832 with respect to the end of the STFs 812, and (ii) the beginning of the LTS 866 with respect to the end of the STF 850, in some embodiments. Similarly, LTSs 836 correspond with the LTS 870 due to the time correspondence between (i) the beginning of LTSs 836 with respect to the end of the STFs 812, and (ii) the beginning of the LTS 870 with respect to the end of the STF 850, in some embodiments.

In other embodiments, however, the LTSs 832 and 836 are not configured to signal to a receiver that the data unit including the preamble 804 is a size 32 DFT (FFT) frequency duplicated mode data unit nor that the data unit including the preamble 804 is not a size 64 DFT (FFT) regular mode data unit.

In some embodiments, one or both of the SIG fields 820 and 824 are configured to signal to a receiver that the data unit including the preamble 804 is a size 32 DFT (FFT) frequency duplicated mode data unit and/or that the data unit including the preamble 804 is not a size 64 DFT (FFT) regular mode data unit. This assists the receiver to recognize the format of the data unit 804 in time to take advantage of the redundancy between different size 32 DFT (FFT) portions of the SIG fields 820, 824, 828 of the preamble 704 in decoding the SIG fields 820, 824, 828. For example, in some embodiments, one or both of the SIG fields 820 and 824 are modulated using BPSK, whereas corresponding in time SIG fields 858a and 858b are modulated using QBPSK. SIG fields 820 of the preamble 804 correspond in time with the SIG field 858a of the preamble 800 due to the time correspondence between (i) the beginning of the SIG fields 820 with respect to the end of the STFs 812, and (ii) the beginning of the SIG field 858a with respect to the end of the STF 850, in some embodiments. Similarly, the SIG fields 824 of the preamble 804 correspond in time with the SIG field 858b of the preamble 800 due to the time correspondence between (i) the beginning of the SIG fields 824 with respect to the end of the STFs 812, and (ii) the beginning of the SIG field 858b with respect to the end of the STF 850, in some embodiments.

In other embodiments, one or both of the SIG fields 820 and 824 are modulated using QBPSK, whereas corresponding in time SIG fields 858a and 858b are modulated using BPSK.

In other embodiments, one of the SIG field portions 820 and 824 is modulated using the technique as used for the corresponding in time SIG field 858, whereas the one of the SIG field portions 820 and 824 is modulated using a technique different than used for the corresponding in time SIG field 858.

In general, one or both of (i) the SIG fields 820, and (ii) the SIG fields 824 are modulated differently than the corresponding fields 858 in the preamble 800 to enable a receiver to distinguish between the preamble 800 and the preamble 804, in some embodiments.

FIG. 11 is a diagram of a portion of the preamble 800 (FIG. 10) of the example normal mode data unit having a bandwidth corresponding to a size 64 DFT (FFT) (or a similar preamble of a similar data unit), a diagram of a portion of a preamble 902 of an example normal mode data unit having a bandwidth corresponding to a size 32 DFT (FFT), and a diagram of a portion of a preamble 904 of an example frequency duplication mode data unit having a bandwidth corresponding to a size 64 DFT (FFT), according to an embodiment. The frequency duplication mode data unit includes a first portion 908a corresponding to a size 32 DFT (FFT), and a second portion 908b corresponding to a size 32 DFT (FFT), where the second portion 908b is a duplicated version of the first portion 908a, in an embodiment.

The preamble 904 of the frequency duplication mode data unit includes STF portions 912, LTF portions 916 (each of size 32 DFT (FFT)), and SIG field portions 920, 924, and 928. Each LTF portion 916 includes an LTS 932, and an LTS 936.

The preamble 902 of the size 32 DFT (FFT) normal mode data unit includes an STF 950, an LTF 954, and SIG fields 958, 962, and 966. The LTF 954 includes an LTS 970, and an LTS 974.

In some embodiments, one or both of the LTSs 932 and 928 are configured to signal to a receiver that the data unit including the preamble 904 is a size 32 DFT (FFT) frequency duplicated mode data unit and/or that the data unit including the preamble 904 is not a size 64 DFT (FFT) regular mode data unit. This assists the receiver to recognize the format of the data unit 904 in time to take advantage of the redundancy between different size 32 DFT (FFT) portions of the SIG fields 920, 924, and 928 in decoding the SIG field. For example, in some embodiments, one or both of the LTSs 932 and 936 are configured such that cross-correlation of these tones with the corresponding tones in the LTSs 866 and 870 are zero or of another suitably low correlation value (e.g., less than or equal to 1). For example, in an embodiment, one or both of the LTSs 932 and 936 are orthogonal, or near-orthogonal, with the corresponding LTSs 866 and 870. Thus, a receiver can detect that the data unit including the preamble 904 is not a size 64 DFT (FFT) regular mode data unit based on the LTSs 932 and 936. LTSs 932 correspond with the LTS 866 due to the time correspondence between (i) the beginning of LTSs 932 with respect to the end of the STFs 912, and (ii) the beginning of the LTS 866 with respect to the end of the STF 850, in some embodiments. Similarly, LTSs 936 correspond with the LTS 870 due to the time correspondence between (i) the beginning of LTSs 936 with respect to the end of the STFs 912, and (ii) the beginning of the LTS 870 with respect to the end of the STF 850, in some embodiments.

In other embodiments, however, the LTSs 932 and 936 are not configured to signal to a receiver that the data unit including the preamble 904 is a size 32 DFT (FFT) frequency duplicated mode data unit nor that the data unit including the preamble 904 is not a size 64 DFT (FFT) regular mode data unit.

In an embodiment, the LTS 970 of the preamble 902 is the same as each LTS 932 of the preamble 904. In an embodiment, the LTS 974 of the preamble 902 is the same as each LTS 936 of the preamble 904. In an embodiment, one or both of the LTSs 970 and 974 are configured to signal to a receiver that the data unit including the preamble 902 is not a size 64 DFT (FFT) regular mode data unit.

In some embodiments, one or both of the LTSs 932 and 936 are configured such that cross-correlation of these tones with the corresponding tones in the LTSs 970 and 974 are zero or of another suitably low correlation value (e.g., less than or equal to 1). For example, in an embodiment, one or both of the LTSs 932 and 936 are orthogonal, or near-orthogonal, with the corresponding LTSs 970 and 974. Thus, a receiver can detect that the data unit including the preamble 904 is not a size 32 DFT (FFT) regular mode data unit based on the LTSs 932 and 936, in an embodiment. LTSs 932 correspond with the LTS 970 due to the time correspondence between (i) the beginning of LTSs 932 with respect to the end of the STFs 912, and (ii) the beginning of the LTS 970 with respect to the end of the STF 950, in some embodiments. Similarly, LTSs 936 correspond with the LTS 974 due to the time correspondence between (i) the beginning of LTSs 936 with respect to the end of the STFs 912, and (ii) the beginning of the LTS 974 with respect to the end of the STF 950, in some embodiments.

In some embodiments, one or more of the SIG fields 920, 924, and 928 are configured to signal to a receiver that the data unit including the preamble 904 is a size 32 DFT (FFT) frequency duplicated mode data unit and/or that the data unit including the preamble 604 is not a size 32 DFT (FFT) regular mode data unit. This assists the receiver to recognize the format of the data unit 904 in time to take advantage of the redundancy between different size 32 DFT (FFT) portions of the SIG fields 920, 924, and 928 of the preamble 04 in decoding the SIG fields. For example, in some embodiments, one or more of the SIG fields 920, 924, and 928 are modulated using QBPSK, whereas corresponding in time SIG fields 958, 962, and 966 are modulated using BPSK. The SIG fields 920 of the preamble 904 correspond in time with the SIG field 958 of the preamble 902 due to the time correspondence between (i) the beginning of the SIG fields 920 with respect to the end of the STFs 912, and (ii) the beginning of the SIG field 958 with respect to the end of the STF 950, in some embodiments. Similarly, the SIG fields 924 of the preamble 904 correspond in time with the SIG field 962 of the preamble 902 due to the time correspondence between (i) the beginning of the SIG fields 924 with respect to the end of the STFs 912, and (ii) the beginning of the SIG field 962 with respect to the end of the STF 950, in some embodiments. Similarly, the SIG fields 928 of the preamble 904 correspond in time with the SIG field 966 of the preamble 902 due to the time correspondence between (i) the beginning of the SIG fields 928 with respect to the end of the STFs 912, and (ii) the beginning of the SIG field 966 with respect to the end of the STF 950, in some embodiments.

In another embodiment, the SIG fields 920 are modulated using BPSK and SIG fields 928 are modulated using QBPSK, whereas SIG fields 958 and 966 are modulated using BPSK. In an embodiment, the SIG fields 924 are also modulated using QBPSK, whereas the SIG field 962 is modulated using BPSK.

In some embodiments, one or both of the LTS fields 932 and 936 are configured (such as discussed above) to enable a receiver to distinguish the preamble 904 from a size 64 DFT (FFT) non-frequency duplicated mode data unit, while one or more SIG fields (e.g., SIG fields 920, 924, and 928) of the preamble 904 are modulated using a different technique (such as discussed above) as compared to corresponding (in time) SIG fields in a size 32 DFT (FFT) non-frequency duplicated mode data unit to enable a receiver to distinguish the preamble 904 from a size 32 DFT (FFT) non-frequency duplicated mode data unit.

In other embodiments, one or more of the SIG fields 920, 924, and 928 are modulated using BPSK, whereas corresponding in time SIG fields 958, 962, and 966 are modulated using QBPSK. Other similar variations are contemplated. In general, in some embodiments, at least one of the SIG fields 920, 924, and 928 of the preamble 904 are modulated using a different modulation technique than is used in the corresponding (in time) at least one of the SIG fields 958, 962, and 966 of the preamble 902. In these embodiments, a receiver can detect the different modulation between the corresponding in time SIG fields 920 and the SIG field 858 to help distinguish the preamble 904 from a size 64 DFT (FFT) non-frequency duplicated mode data unit. In these embodiments, one or both SIG fields 924 and 928 of the preamble 904 are modulated using a different technique (such as discussed above) as compared to corresponding (in time) SIG fields in a size 32 DFT (FFT) non-frequency duplicated mode data unit to enable a receiver to distinguish the preamble 904 from a size 32 DFT (FFT) non-frequency duplicated mode data unit.

In some embodiments, a network interface, such as the network interface 16 and the network interface 27, is configured to transmit the STF of a frequency duplicated mode data unit with higher power than the rest of the data unit. Transmitting the STF of a frequency duplicated mode data unit with higher power than the rest of the data unit helps boost packet detection sensitivity, at least in some embodiments and/or scenarios. For example, in an embodiment, the network interface is configured to transmit the STF of a frequency duplicated mode data unit with 3 dB higher power than the rest of the data unit. In other embodiments, the network interface is configured to transmit the STF of a frequency duplicated mode data unit with x dB higher power than the rest of the data unit, where x is a suitable value such as 2, 4, 5, 6, etc., or some suitable non-integer value.

Transmitting the STF of a frequency duplicated mode data unit with higher power than the rest of the data unit may adversely affect operation of an analog-to-digital converter (ADC) at the receiver, at least in some embodiments and/or scenarios, because an automatic gain control (AGC) unit prior to the ADC may be set for the data unit based on the STF. In some embodiments, the network interface is configured to transmit the STF of a frequency duplicated mode data unit with higher power than the rest of the data unit only for a set of one or more lowest MCSs used in the wireless network because, at least in some embodiments and/or scenarios, adverse effects on operation of the ADC at the receiver is minimal when using the set of one or more lowest MCSs.

Although examples above involve a width 32 DFT (FFT) being duplicated to form a size 64 DFT (FFT) frequency duplicated mode data unit, similar techniques can be utilized to form a size 128 DFT (FFT) frequency duplicated mode data unit, a size 256 DFT (FFT) frequency duplicated mode data unit, etc., formed by duplicating a width 32 DFT (FFT). Techniques such as described above may be utilize to allow a receiver to distinguish such frequency duplicated mode data units from a size 32 DFT (FFT) non-frequency duplicated mode data unit, and from a size 128 DFT (FFT) non-frequency duplicated mode data unit, a size 256 DFT (FFT) non-frequency duplicated mode data unit, etc. In other embodiments, the data unit having a suitable width other than a size 32 DFT (FFT) is frequency duplicated, such as a size 64 DFT (FFT), a size 128 DFT (FFT), etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A method for generating a physical layer (PHY) frequency duplication mode data unit for transmission via a communication channel, the method comprising:
generating a preamble of the PHY frequency duplication mode data unit, wherein the preamble includes a signal field, and wherein the preamble is configured so that a receiver can determine that the data unit is a frequency duplication mode-type data unit prior to decoding the signal field of the preamble;
generating a payload of the PHY frequency duplication mode data unit; and
causing the PHY frequency duplication mode data unit to be transmitted.

2. The method of claim 1, wherein generating the preamble comprises generating a training field of the preamble, wherein the training field of the preamble is different than training fields utilized in non-frequency duplication mode data units at corresponding positions in the non-frequency duplication mode data units.

3. The method of claim 2, wherein the training field of the preamble is orthogonal or near orthogonal with a training field utilized in a non-frequency duplication mode data unit at a corresponding position in the non-frequency duplication mode data unit.

4. The method of claim 1, wherein generating the preamble comprises modulating a field of the preamble using a first modulation technique that is different than a second modulation technique utilized to modulate a field in a non-frequency duplication mode data unit at a corresponding position in the non-frequency duplication mode data unit.

5. The method of claim 4, wherein:
the first modulation technique is one of (i) binary phase shift keying (BPSK), or (ii) quaternary binary phase shift keying (QBPSK); and
the second modulation technique is the other one of (i) BPSK, or (ii) QBPSK.

6. The method of claim 1, wherein generating the preamble comprises:
generating a first training field of the preamble, wherein the first training field of the preamble is different than a training field utilized in a first non-frequency duplication mode data unit at a corresponding position in the first non-frequency duplication mode data units; and
modulating one of (i) a second training field of the preamble, or (ii) a signal field of the preamble using a first modulation technique that is different than a second modulation technique utilized to modulate a field in a second non-frequency duplication mode data unit at a corresponding position in the second non-frequency duplication mode data unit.

7. The method of claim 6, wherein:
the first non-frequency duplication mode data unit has a bandwidth equal to a bandwidth of the PHY frequency duplication mode data unit; and
the second non-frequency duplication mode data unit has a bandwidth equal to a fraction of the bandwidth of the PHY frequency duplication mode data unit.

8. The method of claim 6, wherein:
the first non-frequency duplication mode data unit has a bandwidth equal to a fraction of a bandwidth of the PHY frequency duplication mode data unit; and
the second non-frequency duplication mode data unit has a bandwidth equal to the bandwidth of the PHY frequency duplication mode data unit.

9. The method of claim 1, wherein causing the PHY frequency duplication mode data unit to be transmitted comprises causing a training field of the preamble to be transmitted at a higher power than remaining portions of the PHY frequency duplication mode data unit.

10. The method of claim 9, wherein causing the PHY frequency duplication mode data unit to be transmitted comprises causing the training field of the preamble to be transmitted at a power 3 dB higher than the power of the remaining portions of the PHY frequency duplication mode data unit.

11. An apparatus for generating a physical layer (PHY) data unit for transmission via a communication channel, the apparatus comprising:
a network interface configured to
generate a preamble of the PHY frequency duplication mode data unit, wherein the preamble includes a signal field, and wherein the preamble is configured so that a receiver can determine that the data unit is a frequency duplication mode-type data unit prior to decoding the signal field of the preamble,
generate a payload of the PHY frequency duplication mode data unit, and
transmit the PHY frequency duplication mode data unit.

12. The apparatus of claim 11, wherein the network interface is configured to generate a training field of the preamble, wherein the training field of the preamble is different than training fields utilized in non-frequency duplication mode data units at corresponding positions in the non-frequency duplication mode data units.

13. The apparatus of claim 12, wherein the training field of the preamble is orthogonal or near orthogonal with a training field utilized in a non-frequency duplication mode data unit at a corresponding position in the non-frequency duplication mode data unit.

14. The apparatus of claim 11, wherein the network interface is configured to modulate a field of the preamble using a first modulation technique that is different than a second modulation technique utilized to modulate a field in a non-frequency duplication mode data unit at a corresponding position in the non-frequency duplication mode data unit.

15. The apparatus of claim 14, wherein:
the first modulation technique is one of (i) binary phase shift keying (BPSK), or (ii) quaternary binary phase shift keying (QBPSK); and
the second modulation technique is the other one of (i) BPSK, or (ii) QBPSK.

16. The apparatus of claim 11, wherein the network interface is configured to:
generate a first training field of the preamble, wherein the first training field of the preamble is different than a training field utilized in a first non-frequency duplication mode data unit at a corresponding position in the first non-frequency duplication mode data units, and
modulate one of (i) a second training field of the preamble, or (ii) a signal field of the preamble using a first modulation technique that is different than a second modulation technique utilized to modulate a field in a second non-frequency duplication mode data unit at a corresponding position in the second non-frequency duplication mode data unit.

17. The apparatus of claim 16, wherein:
the first non-frequency duplication mode data unit has a bandwidth equal to a bandwidth of the PHY frequency duplication mode data unit; and
the second non-frequency duplication mode data unit has a bandwidth equal to a fraction of the bandwidth of the PHY frequency duplication mode data unit.

18. The apparatus of claim 16, wherein:
the first non-frequency duplication mode data unit has a bandwidth equal to a fraction of a bandwidth of the PHY frequency duplication mode data unit; and
the second non-frequency duplication mode data unit has a bandwidth equal to the bandwidth of the PHY frequency duplication mode data unit.

19. The apparatus of claim 11, wherein the network interface is configured to transmit the training field of the preamble at a higher power than remaining portions of the PHY frequency duplication mode data unit.

20. The apparatus of claim 19, wherein the network interface is configured to transmit the training field of the preamble at a power 3 dB higher than the power of the remaining portions of the PHY frequency duplication mode data unit.

* * * * *